US008700551B2

(12) United States Patent
Shama et al.

(10) Patent No.: US 8,700,551 B2
(45) Date of Patent: *Apr. 15, 2014

(54) SYSTEMS AND METHODS FOR IDENTIFYING PROVIDER NONCUSTOMERS AS LIKELY ACQUISITION TARGETS

(75) Inventors: Yaacov Shama, Raanana (IL); Tal Segalov, Kfar Saba (IL); Ehud Ben-Reuven, New York, NY (US); Evgeny Drukh, Ness Ziona (IL); Uri Sternfeld, Kfar Saba (IL)

(73) Assignee: Venture Lending & Leasing VI, Inc., Portola Valley, CA (US)

( * ) Notice: Subject to any disclaimer, the term of this patent is extended or adjusted under 35 U.S.C. 154(b) by 524 days.

This patent is subject to a terminal disclaimer.

(21) Appl. No.: 12/853,766

(22) Filed: Aug. 10, 2010

(65) Prior Publication Data

US 2011/0035347 A1    Feb. 10, 2011

Related U.S. Application Data

(60) Provisional application No. 61/262,901, filed on Nov. 19, 2009, provisional application No. 61/236,189, filed on Aug. 24, 2009, provisional application No. 61/233,525, filed on Aug. 13, 2009, provisional application No. 61/232,577, filed on Aug. 10, 2009, provisional application No. 61/267,095, filed on Dec. 7, 2009, provisional application No. 61/292,526, filed on Jan. 6, 2010.

(51) Int. Cl.
*G06E 1/00* (2006.01)
*G06E 3/00* (2006.01)

(52) U.S. Cl.
USPC ............................. 706/21; 700/250; 324/527

(58) Field of Classification Search
USPC .......................................................... 706/21
See application file for complete search history.

(56) References Cited

U.S. PATENT DOCUMENTS

| 6,029,195 A * | 2/2000 | Herz ............................. 725/116 |
| 2006/0294095 A1* | 12/2006 | Berk et al. ......................... 707/6 |
| 2008/0119165 A1* | 5/2008 | Mittal et al. .................. 455/411 |

* cited by examiner

*Primary Examiner* — Jeffrey A Gaffin
*Assistant Examiner* — Kalpana Bharadwaj
(74) *Attorney, Agent, or Firm* — Ostrow Kaufman, LLP

(57) ABSTRACT

The present invention is directed towards systems and methods for predicting one or more desired properties of external nodes or properties of their relations with internal nodes, based on a selected group of nodes about which it is known whether the nodes have the desired properties, or it is known whether they have a desired relation property with an internal node. The method comprises storing in one or more data structures a first data set regarding external nodes and a second data set regarding nodes with known properties in a selected group, each data set having one or more data items representing one or more events relating to or attributes of each node in the data set, the second data set including one or more types of data items not included in the first data set. The method then models the second data set to identify from the second data one or more modeled events or attributes of internal nodes in the selected group that are statistically likely to identify the nodes or their relations, that have the desired properties and predicts which of the external nodes are statistically likely to have the one or more desired properties, or desired relation property with internal node, based on the identified plurality of modeled events or attributes and the events or attributes in the first data set.

27 Claims, 17 Drawing Sheets

US 8,700,551 B2

SYSTEMS AND METHODS FOR IDENTIFYING PROVIDER NONCUSTOMERS AS LIKELY ACQUISITION TARGETS

CLAIM OF PRIORITY

The present application is a non-provisional of and claims priority to the following six (6) provisional applications, each of which are hereby incorporated herein by reference in their entirety:

U.S. Provisional Application No. 61/262,901, entitled "EXTERNAL ACQUISITION SYSTEM," filed Nov. 19, 2009;

U.S. Provisional Application No. 61/236,189, entitled "EXTERNAL NETWORK STATISTICS," filed Sep. 1, 2009;

U.S. Provisional Application No. 61/233,525, entitled "PHONE NUMBER EXCHANGE," filed Aug. 13, 2009;

U.S. Provisional Application No. 61/232,577, entitled "MODELING OF TELEPHONE LINKS," filed Aug. 10, 2009;

U.S. Provisional Application No. 61/267,095, entitled "MODELING BANK ACCOUNTS," filed Dec. 7, 2009; and U.S. Provisional Application No. 61/292,526, entitled "MOBILE INTERNET PROFILING," filed Jan. 6, 2010.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

Embodiments of the invention described herein generally relate to modeling known and unknown nodes in a hybrid network in order to generate properties for unknown nodes and of their relations. More specifically, embodiments of the present invention are directed towards systems and methods for utilizing classification algorithms and learning machine algorithms to generate properties of unknown network nodes and their relations based on characteristics of both unknown and known nodes and their relations.

BACKGROUND OF THE INVENTION

Collecting information on node properties in a network and generating statistical analysis is useful in many aspects. The goal is to generate useful statistical information on nodes' properties. An example would be a network in which the nodes are customers and the gathered information is used to plan a marketing campaign. Example of systems using this information is churn prediction and up-sell lead generation systems.

One goal of service providers is to maximize their customer base, and consequently maximize the profit earned from their customers. Thus, customer acquisition and retention are important aspects of the operation of a service provider. One primary vehicle for acquiring customers is to utilize lists of potential customers, known as leads. The current state of the art fails to utilize the wealth of information the service provider has to generate potential leads. As such, leads are often simply lists of potential customers without any clearly defined relation to the service provider. Since these leads are not generated using the underlying network data, many of the leads will have a low probability for successful acquisition.

Another problem complicating the generation of leads is that while service providers have a wealth of information regarding their own customers' usages and habits, they know significantly less about people or entities that are not their customers or which are the customers of rival service providers. For example, a telecom provider knows the name, billing information, account type, etc., of a given customer in a telecommunications network. In contrast, the information a service provider has about others who aren't customers is often limited to the interactions between the rival provider's customers and their own customers.

Thus there exists a need in the current state of the art for systems and methods for identifying high quality leads in a network containing both known nodes of a service provider and unknown nodes belonging to rival service providers.

SUMMARY OF THE INVENTION

The present invention is directed towards systems and methods for predicting one or more desired properties of external nodes based on a selected group of internal nodes about which it is known whether the internal nodes have the desired properties. In one embodiment, a method stores a first data set regarding the external nodes and a second data set regarding the internal nodes in the selected group in one or more databases, each data set having one or more data items representing one or more events relating to or attributes of each node in the data set. In one embodiment, second data set is generated based on a larger data set. In such an embodiment, generating the second data set includes selecting internal nodes from the larger data set based on one or more data items in the larger set having values identifying the corresponding internal nodes as having or not having the one or more desired properties.

In alternative embodiments, storing the second data set includes storing data items regarding internal nodes that all are known to have the one or more desired properties. In an alternative embodiment the second data set includes one or more types of data items not included in the first data set. In one embodiment, storing the second data set includes storing data items regarding a positive set of internal nodes that are known to have the one or more desired properties and a negative set of internal nodes that are known to not have the one or more desired properties. In an alternative embodiment the second data set includes storing data items regarding external nodes that all are known to have the one or more desired properties. In an optional virtualization step, the method then models the second data set regarding internal nodes after the first data set regarding external nodes at least by eliminating from the second data set the one or more data item types not included in the first data set.

Internal nodes represent customers of a service provider and the external nodes represent entities that are not customers of the service provider, where the one or more desired properties include one or more properties of the non-customer entities that are more likely to make them become customers of the service provider, and where storing the first and second data sets includes storing data received from the service provider. In one embodiment, storing the first and second data sets includes storing transaction data regarding transactions performed by the customer and non-customer entities of the service provider. In this embodiment, storing transaction data includes storing transaction data for the second data set including one or more data items related to transactions performed by the service provider customers, the data items only being receivable for transactions performed by the service provider customers.

The method then statistically analyzes the modeled second data set to identify one or more collections of events or attributes of internal nodes in the selected group that are statistically likely to identify the internal nodes that have the desired properties. In one embodiment, statistically analyzing the modeled second data set includes identifying from the modeled second data set one or more first collections of events or attributes of internal nodes in the selected group that are statistically likely to identify the internal nodes that have the desired properties and one or more second collections of events or attributes of internal nodes in the selected group that are statistically likely to identify the internal nodes that don't have the desired properties. In a second embodiment, statistically analyzing the modeled second data set includes identifying from the modeled second data set a collection of events or attributes that generate a statistically high distinction between the internal nodes in the positive set and the internal nodes in the negative set. In another embodiment, statistically analyzing the modeled second data set includes executing a machine learning algorithm program.

Finally the method predicts which of the external nodes are statistically likely to have the one or more desired properties based on the identified collections of events or attributes and the events or attributes in the first data set.

In one possible embodiment, a service provider is a telephone operator, and wherein storing transaction data includes storing call detail records or call data records (CDRs) of telephone calls by or to customers and non-customer entities. When the service provider is a telephone operator, the one or more desired properties are properties of entities selected from the group consisting of: entities being families, entities being small offices/home offices, entities having high return per user, entities being early adaptors of new technology. Additionally, for a telephone operator, selecting service provider customers for the second data set based on service provider data identifying the selected customers as either having or not having the one or more desired properties.

In one possible embodiment, the properties know about customers of a telephone operator is augmented by monitoring the internet activity made by the same customer over the provider's network.

In one possible embodiment, the properties of both internal and external nodes are augmented by using an object identifier to define the node and extracting properties from documents that carry the same object identifier.

In one possible embodiment, the likelihood of an external node to be acquired is estimated based on the identity of other external nodes that were already acquired.

In one possible embodiment, the likelihood of an external node to be acquired is estimated based on a change in the transaction pattern of the external node with internal nodes.

In one possible embodiment, the likelihood of an external node to be acquired is estimated based on the contractual period of the external node with the external provider.

All that was described in the summary of this invention with respect to predicting properties of external nodes can also be applied to predicting properties of the relations the external nodes with internal nodes.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
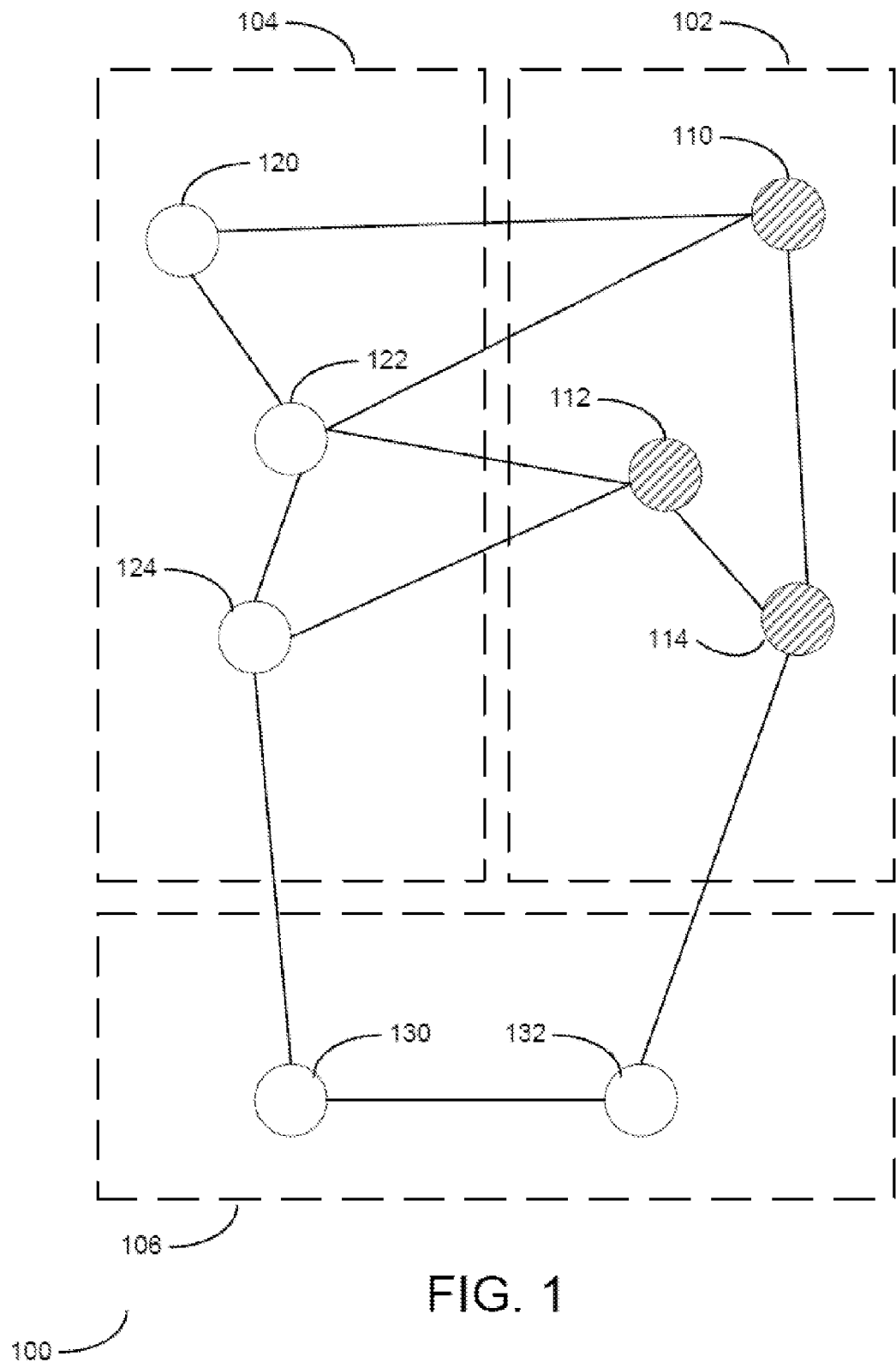
FIG. 1 presents a diagram illustrating an exemplary network of known and unknown nodes according to one embodiment of the present invention.

FIG. 1 presents a diagram illustrating an exemplary network of known and unknown nodes according to one embodiment of the present invention. According to the embodiment FIG. 1 illustrates, a network 100 is logically divided into a plurality of subnets 102, 104, 106. In the illustrated embodiment, subnet 102 illustrates a network of known nodes. In the illustrated embodiment, known nodes include a plurality of nodes having properties that are known to a network operator. For example, in the telephony realm, internal nodes 110, 112, and 114 are customers of a telecom provider, whereas external nodes 120, 122, 124, 130, and 132 are customers of other telecom providers. For example, a telecom provider may store call detail records (CDRs) between nodes that represent physical entities. For example, entities can be individuals, members of families, entities being small offices/home offices, entities being individuals having high return per user, and entities being internet customers of the service provider.

The primary difference between internal nodes and external nodes is the amount of data available to a provider. The internal nodes provide detailed information about themselves, and their communication with other nodes, represented by edges in the network 100. Conversely, a provider may not be able to determine all properties of the external nodes. For example, in the telecom area, a provider knows various properties of internal nodes 110, 112, and 114, including, but not limited to, the node's account number, plan options, age, gender, location, and various other properties.

In the illustrated embodiment, a provider knows significantly less about the external nodes. Generally, a provider will only know about the external nodes through monitoring connections between internal and external nodes (i.e., edges in the network 100). For example, a provider would have access to various properties of node 122 such as telephone number, call logs between nodes 110 and 112, etc. Notably, a provider would not have any information regarding nodes that are not connected to the provider's internal nodes, e.g., node 130.

Figure 2:
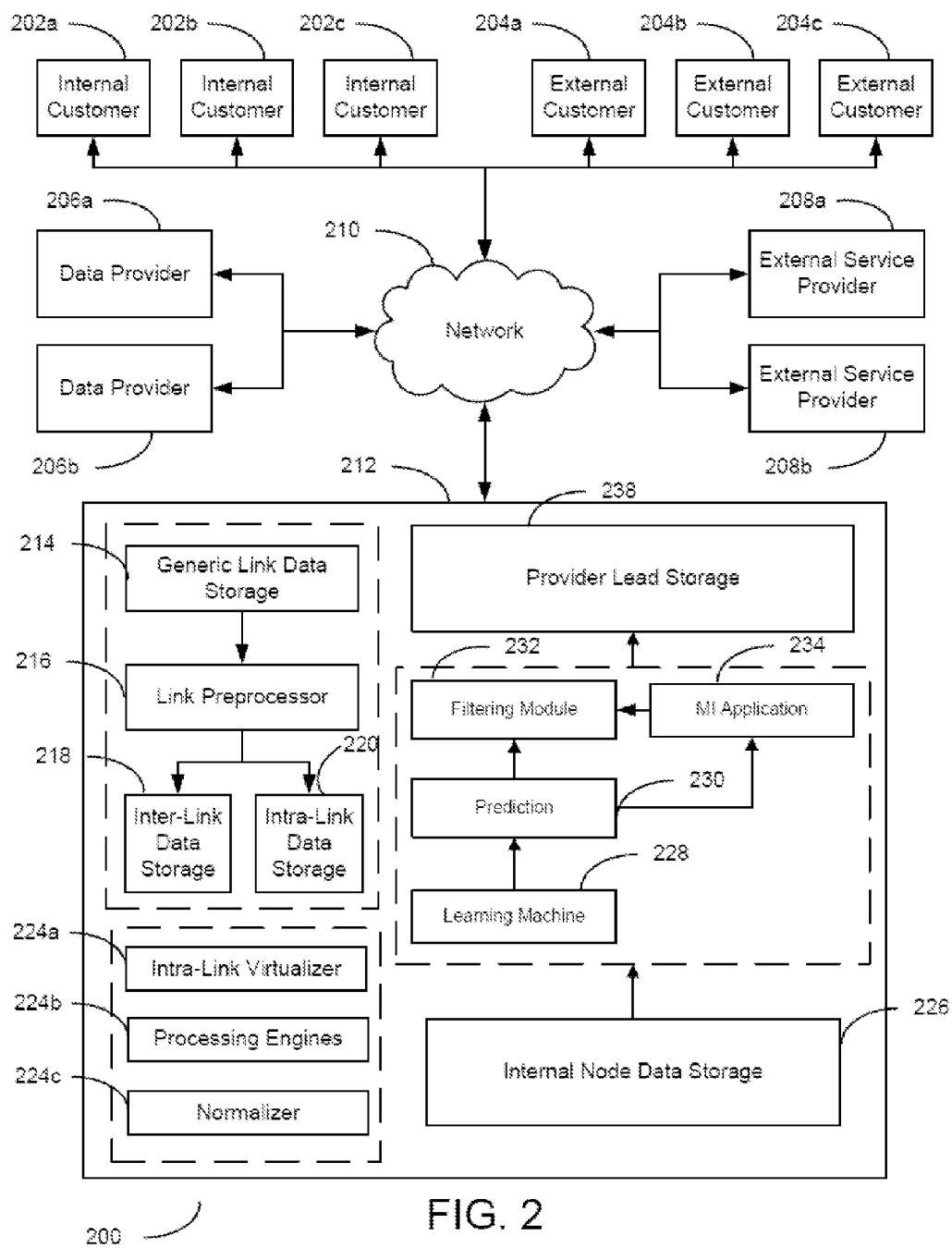
FIG. 2 presents a block diagram illustrating a system for predicting features of external network nodes according to one embodiment of the present invention.

FIG. 2 presents a block diagram illustrating a system for predicting features of external network nodes and features of relations between internal and external nodes according to one embodiment of the present invention. According to the embodiment that FIG. 2 illustrates, a plurality of internal customers 202a, 202b, 202c, external customers 204a, 204b, 204c, data providers 206a, 206b, and external service providers 208a, 208b, are connected to a service provider's information collection center 212 via network 210.

In the illustrated embodiment, internal customers 202a, 202b, 202c are individuals or business entities utilizing a service provided network 210 which is overseen by the service provider's information collection center 212, whereas external customers 204a, 204b, 204c are individuals or businesses utilizing a service provided by a rival service provider 208a and 208b. For example, internal customers 202a, 202b, 202c may include a plurality of telephone customers of a telecom provider 212, or a plurality of bank account holders of bank 212. Internal customers 202a, 202b, 202c conduct communication with other internal customers 202a, 202b, 202c as well as external customers 204a, 204b, 204c through network 210. In an alternative embodiment, internal customers 202a, 202b, 202c may include members of a first social networking site, 212, and external customers 204a, 204b, 204c may include members of other social networking sites, 208a and 208b. In an alternative embodiment, internal customers 202a, 202b, 202c may include customers of a shipping company and external customers 204a, 204b, 204c may include members of other shipping companies. In an alternative embodiment, internal customers 202a, 202b, 202c may include subscribers of an email service provider, 212, and external customers 204a, 204b, 204c may include subscribers of other email service providers, 208a and 208b.

In some embodiments, communication is routed through service provider's information collection center 212. In other embodiments, communications are point-to-point and only passively monitored by service provider's information collection center 212. In other embodiments, communications are passed through an external or virtual network and only passively monitored by service provider's information collection center 212.

Additionally, the system 200 illustrates a plurality of data providers 206a and 206b. These data providers 206a and 206b supply data to internal and external customers. For example, data providers 206a and 206b operate web servers, or other hardware components, providing web pages over HTTP, WAP, or similar protocols. In alternative embodiments, network 210 utilizes various networks employing various protocols allowing for voice, text, data, and other transmissions.

Service provider's information collection center 212 includes a generic link data storage unit 214. In the illustrated embodiment, generic link data storage 214 stores information regarding the communications between the aforementioned nodes on the network. For example, in the telecom example, generic link data storage unit 214 stores the date, time, start location, and end location for internal nodes of a telephone call or data transmission. In a banking setting, the generic link data storage unit 214 stores the amount, asset, payee name, payor name, routing and transit number, transaction date, etc. In an e-mail or social networking setting, generic link data storage unit 214 stores identifiers of the sender and receiver, as well as various other aspects relating to the social network or e-mail user. In a shipping company network, generic link data storage unit 214 stores sender address, receiver address and size of object shipped. In the illustrated embodiment, the service provider's information collection center 212 only stores intra-link data, that is, data transmitted between internal customers 202a, 202b, 202c, or inter-link data between internal customers 202a, 202b, 202c and external customers 204a, 204b, 204c. Notably, the system 200 is unable to identify external-to-external communications, as the service provider's information collection center 212 only has access to communications involving its own customers. In the illustrated embodiment, the data storage units 214, 218, 220, 226, and 238 may comprise any storage unit including any data structure, database, flat file, or other storage mechanism.

Generic link data storage unit 214 is further coupled to link preprocessor 216. Link preprocessor 216 includes a plurality of servers executing preprocessing tasks such as statistical analysis tasks, as will be discussed further herein. In alternative embodiments, link preprocessor 216 additionally identifies internal-to-internal node transmission and internal-to-external node transmissions and stores these transmissions in the intra-link data storage 220 and inter-link data storage 218, respectively.

Service provider's information collection center 212 includes intra-link virtualizer 224a. This module is implemented by a plurality of servers operative to analyze the data stored within the intra-link data storage 220. Details of the operation of the intra-link virtualizer 224 are discussed further herein and are not repeated for the sake of clarity.

In the illustrated embodiment, the service provider's information collection center 212 includes a plurality of engines, 224b, to identify a plurality of features utilized by the training set. The service provider's information collection center 212 further contains a plurality of engines operative to analyze the incoming link data. A fill numbers engine analyzes the call data records (CDRs) and populates the storage modules with particular types of CDRs (e.g., internal-internal and internal-external nodes). A fill calls engine analyzes all internal nodes. A connection engine identifies node to node connection parameters such as the number of calls in a given direction, the connection balance, the time of calls, and the total volume on a connection. A communication profile engine extracts statistics regarding internal-internal calls including the total call volume, the total volume to business numbers, the total volume per week day, the total volume per day part, weekend call volume, SMS count, SMS percentage, the mean and standard deviation of the call length, the outgoing call percentage, the total volume to each number type, the number of contacts, and the number of business contacts.

In one embodiment, the system 200 includes an engine operative to determine which internal nodes have recently been acquired by the system. For example, the system 200 may determine that a subset of internal nodes have been acquired by a telecom provider, e.g., the internal nodes have switched telecom providers to the internal provider.

In addition to the intra-link data storage 220 and inter-link data storage 218, the service provider's information collection center 212 includes an internal node data storage unit 226. In the illustrated embodiment, internal node data storage unit 226 stores detailed data regarding the internal customers 202a, 202b, and 202c. In the illustrated embodiment, detailed information includes various pieces of information regarding the internal customers 202a, 202b, 202c that could be explicitly obtained from the internal customers 202a, 202b, 202c, only if the internal customers 202a, 202b, 202c had voluntarily provided said data to the service provider's information collection center 212. For example, a telecom provider stores information includes data such as billing information, contract type with the provider, group of numbers that are under the same contract, age, gender, familial status, etc. in the internal node data storage unit 226. In an alternative embodiment, the service provider's information collection center 212 further includes data structure for storing data sets regarding the external and internal nodes in addition to the inter-link and intra-link data storage modules. In alternative embodiments, internal node data storage 226 additionally contains information regarding a subset of the external nodes. For example, the internal node data storage 226 may store information regarding external nodes that previously were internal nodes. The service provider's information collection center 212 further comprises a normalization module, 224c, operative to normalize the features identified by the processing engines 224b.

Service provider's information collection center 212 contains various components operative to generate potential leads based on the monitored network traffic including a learning machine 228, prediction module 230, filtering module 232, market intelligence (MI) application server 234 (collectively referred to as the "analysis components"). As will be discussed further herein, the analysis components analyze the data stored in the inter-link data storage 218, intra-link data storage 220, and internal node data storage 226 to generate prediction and statistical models and analyze new, incoming data in order to classify the unknown properties of external nodes.

In the illustrated embodiment, the learning machine 228 receives a training data set based on data from the intra-link data storage 220 and internal node data storage 226, and processed by the intra-link virtualizer 224a, processing engines, 224b and normalized, 224c, and trains a learned model. The learning machine 228 then stores the model in a learned model storage (not shown) for subsequent application. In additional embodiments, the learning machine 228 verifies and validates the generated models. In alternative embodiments, the training data set may be derived in part, or in full, from external node data. As will be discussed, the system 200 may process external node data to generate a training set based on known or derived properties of the external nodes.

The prediction module 230 then receives new, inter-link-data, retrieves a previously generated model, and generates predicted features of the inter-linkdata, as will be described further herein. In the illustrated embodiment, the prediction module 230, may receive inter-link data after the inter-link data has been processed by the processing engines 224b, as described above. The service provider's information collection center 212 then filters the predicted results to increase the relevancy and/or accuracy of the predicted results through filtering module 232. In one embodiment, filtering includes identifying the most likely candidates for acquisition based on a selected property or properties. For example, filtering may include filtering the predicted nodes based on a predetermined segment; e.g., the filtering module 232 may filter only those predictions having a certain gender, age, etc. Prediction module 230 also may use a feedback mechanism (not shown) to refine the model based on end user feedback of a previous model's results. For example, in the telecom example, the prediction module 230 utilizes an end-user's conversion rate or sales figures to refine the model.

Finally, the service provider's information collection center 212 additionally includes a provider lead storage 238 which stores predicted lead data and provide for subsequent search, retrieval, and presentation of the predicted data. The service provider's information collection center 212 employs a MI application 234. In the illustrated embodiment, the MI (Marketing Intelligence) application 234 analyzes a plurality of data records and identifies a plurality of potential leads. In one embodiment, the MI application 234 identifies those customers with the largest number of plans each customer has, sometimes referred to as rate-plan connections. Alternatively, or in conjunction with the foregoing, the MI application 234 further identifies a high availability time frame (e.g., between 12 noon and 3 P.M.) for a given customer in order to facilitate the acquisition of the customer. In alternative embodiments, MI application 234 may receive a plurality of metrics supplied by a customer for analysis. The MI application can directly process the output of the Processing Engines as they are applied on data coming from the inter-link data storage, 218 (not shown) and it can process the output of the prediction module 230. The output of the MI application can be stored in the lead storage and it can be used to filter the results 232.

Figure 3A:
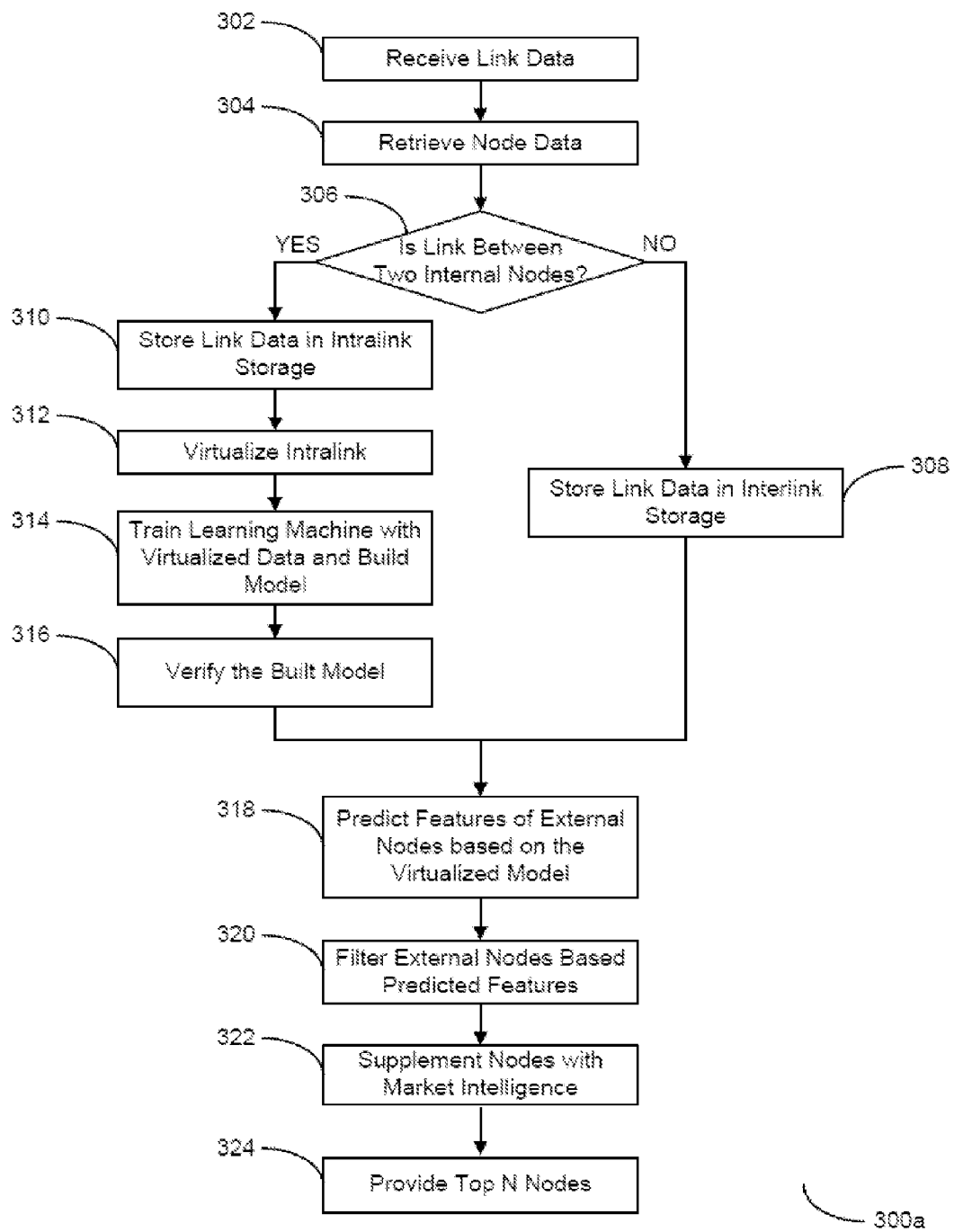
FIG. 3a presents a flow diagram illustrating a method for predicting features of external network nodes according to one embodiment of the present invention.

FIG. 3a presents a flow diagram illustrating a method for predicting features of external network nodes according to one embodiment of the present invention. According to the embodiment FIG. 3 illustrates, a method 300a receives link data, step 302. In the illustrated embodiment, link data includes information regarding telecommunications between individuals or businesses. In alternative embodiments, link data further includes date and time information, duration information, telephone number information (caller and receiver), directional information, etc. In the illustrated embodiment, the method 300a obtains link data from a database of call records stored by a telecom provider.

The method 300a additionally retrieves node data, step 304. In the illustrated embodiment, node data includes information regarding the caller or receiver associated with a given link received in step 302. In one embodiment, node data is only be available to internal nodes, that is, customers of the provider. In one embodiment, the method 300a retrieves only desired properties of the node data.

After retrieving the node and link data, the method 300a determines if the received link data is between two internal nodes, step 306. In the illustrated embodiment, a link between two internal nodes corresponds to a telephone call or other transmission or some summary of several calls or transmissions between two customers of the provider. Conversely, a link between an external node and an internal node corresponds to a call or transmission or summary of several calls or transmissions between a customer and a non-customer.

If the method 300a determines the link is between an internal node and an external node, step 306, the method 300a temporarily stores the link in an interlink data storage, step 308. If the method 300a determines that the link is between two internal nodes, step 306, the method 300a stores the link data in intralink storage, step 310. In the illustrated embodiment, the method 300a stores intralink and interlink data in a database, flat file, or any storage medium capable of store data records. In the illustrated embodiment, the method 300a stores a training subset of an entire set of link data. In one embodiment, the method 300a may store data in slices, a slice representing a subset of the entire data set. For example, the method 300a may slice the data based on phone number, geographical location, temporal position, or other logical boundaries.

For a given link between two internal nodes, the method 300a virtualizes the intralink data, step 312. In the illustrated embodiment, virtualizing intralink data includes parsing features of the internal nodes and link data to remove aspects that would not be available if the link data was an interlink. For example, intralink data includes advanced metrics such as the location, age, gender, service plan, etc., for both sides of the link which are internal nodes. A subset of the internal nodes (training set) have known metrics which are desirable and the task of the method is to predict these desirable metrics on external nodes. Virtualization process includes removing of link and metrics information from the training set in order to make the training set to appear as if it was made from external nodes. Virtualization process removes all intralinks between nodes that are in the training set. Virtualizing the link data for an intralink includes removing these advanced metrics so as to reformat the link data to appear as an inter-link. As part of the virtualization process, the method 300a ignores intralink data that includes communications between two internal nodes corresponding to numbers owned by a single customer. In one embodiment, ownership additionally comprises numbers owned by a single family or business entity.

In alternative embodiments, the method 300a may process the virtualized intralink data using various processing engines and normalize the processed intralink data. Examples of processing engines and normalizing operations are discussed more fully with respect to FIG. 2 and will not be repeated for the sake of clarity.

After virtualizing, processing, and normalizing the intralink data, the method 300a trains a learning machine using the virtualized data, step 314. One embodiment of a method for training a learning machine using virtualized data is discussed more fully with respect to FIG. 3b. After building a trained model, the method 300a verifies the model, step 316. In one embodiment, the method 300a employs cross-validation. In an alternative embodiment, the method 300 estimates prediction error by reusing samples of intralink data. After building the link data model, the method 300a predicts features of external nodes based on the interlink data, step 318. In the illustrated embodiment, the method 300a inserts the interlink data stored in step 308 into the prediction model generated in step 314. Using the prediction model, the method 300a augments the external node data with enhanced features developed in the model. For example, the method 300a may generate predictive features to enable the external nodes to contain features that are known for internal nodes, but not for external nodes.

The method 300a is further enabled to augment the predicted external node data with market intelligence data, step 320. In one embodiment, market intelligence data is determined and validated similar in manner to the training and validating of the learned model. In the illustrated embodiment, market intelligence data includes various metrics including, but not limited to, the month the node first appeared, the current operator of the node, the volume of incoming and outgoing traffic of the node, an acquisition likelihood (e.g., in the telecom area, the likelihood an external customer would become an internal customer), the node type (e.g., business or personal node), node capabilities (e.g., whether the telecom customer has data capabilities), age group, location, and various other aspects related to the node.

The method 300a then filters the predicted external nodes, step 322. In the illustrated embodiment, filtering predicted nodes allows the method 300a to remove external nodes that do not contain valuable features. In one embodiment, filtering predicted nodes includes filtering those nodes with positive values for a predicted feature. For example, a telecom provider can use the method 300a to analyze telephone users that are not subscribers to the telecom provider. In this example, the method 300a filters out those telephone users that are not viable potential customers for the provider. In alternative embodiments, the method 300a filters external nodes based on known features. For example, the method 300a would filter out those customers that have only recently subscribed to a competitors system. As illustrated, after filtering out results that are not viable candidates, the method 300a then selects the top N results, step 324. In the illustrated embodiment, the method 300a analyzes a first number of external nodes; of these nodes, a provider is only interested in a limited number of nodes, thus the method 300a will only return a limited subset of the original external nodes. In one embodiment, selecting top N results comprises filtering the results by acquisition likelihood and selecting a predetermined number of results having a high likelihood of acquisition. In alternative embodiments, the method 300a filters the results by segmenting the predicted data based on predefined segmentation criteria. For example, the method 300a may segment the predicted results based on customer requirements, such as segmenting the data based on age or gender.

Although the method 300a is described with respect to the use of predicting node data, the method 300a may be implemented using link data in lieu of node data. For example, the method 300a may be operative to train a model for predicting links between internal and external nodes in the network. In alternative embodiments, the methods described may be utilized to train a model based on relationship data between nodes within the network, and predict the properties of relationships with unknown nodes. Relationships between nodes may additionally be divided into internal and external relationships. For example, a relationship between an internal and external node inherently contains fewer known properties than a relationship between two internal nodes. Thus, in one embodiment, the methods described may train a model based on virtualized internal-to-internal relationships, in order to predict properties of internal-to-external relationships or external nodes, or a combination of both.

Figure 3B:
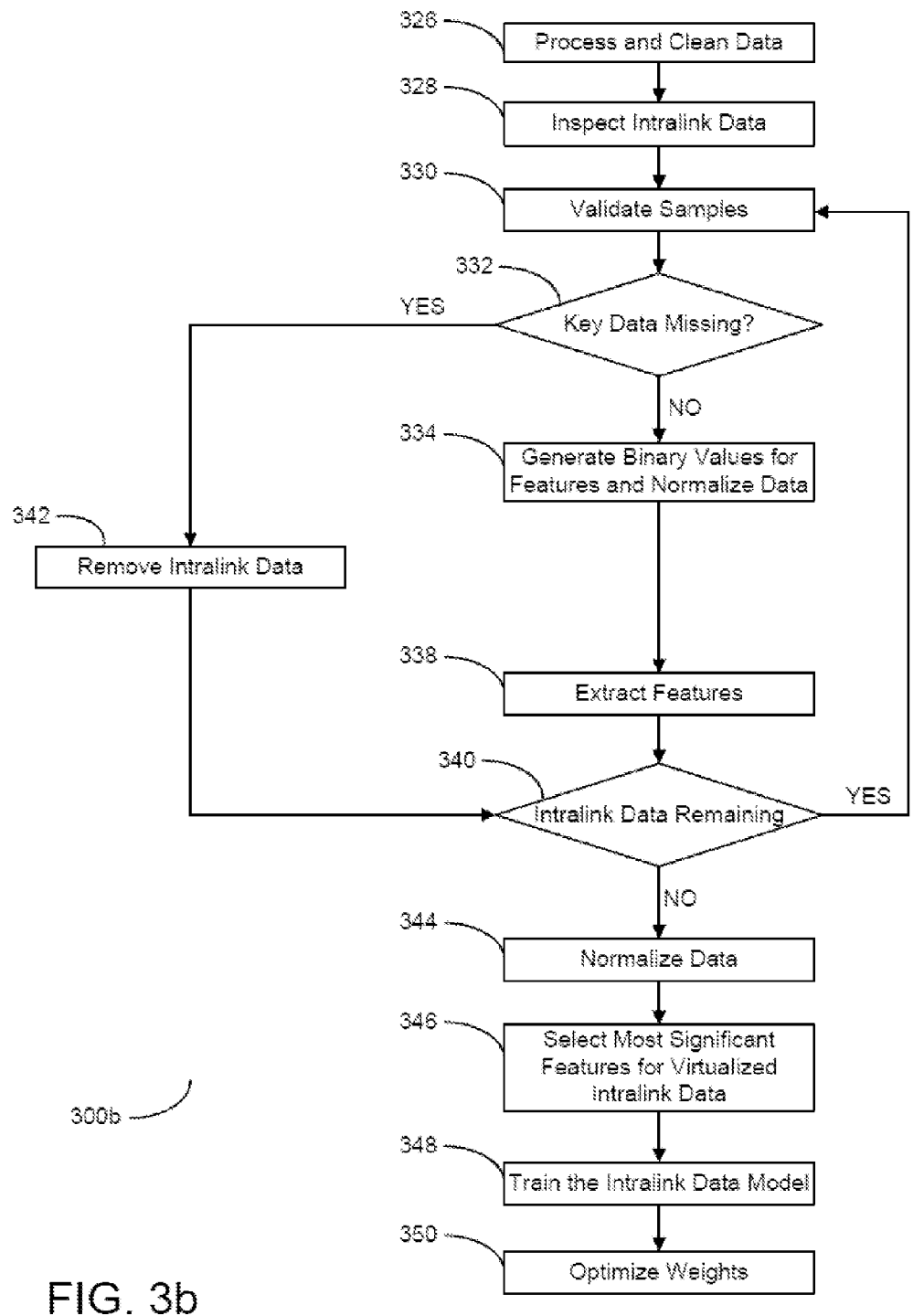
FIG. 3b presents a flow diagram illustrating a method for building a trained model according to one embodiment of the present invention.

FIG. 3b presents a flow diagram illustrating a method for building a trained model according to one embodiment of the present invention. According to the embodiment FIG. 3b illustrates, the method 300b preprocesses and cleans the training data, step 326. The method 300b then inspects training data to determine if key values are missing from a given intralink and remove the given intralink if such data is missing, step 328. In an alternative embodiment, the method 300b utilizes training data comprises interlink data with known desired properties, as compared to utilizing intralink data. If key values are missing, step 332, the method 300b removes the training data from the training set, step 342. In an alternative embodiment, instead of removing the training data, the method 300b computes an average value for the missing key values, or flags the value as missing.

The method 300b randomly samples the entire space and from this sample and considers positive samples, and when available also negative samples, step 330. In an alternative embodiment, the method 300b utilizes a continuous range of samples. The method 300b employs classical significance tests to validate that statistics observed in the random sample are significant in the entire population. In some embodiments, the method 300b only has positive samples and unlabeled samples. In this embodiment, the method 300b uses the positive labeled samples to label the unlabeled samples. The method 300b labels the samples with the highest confidence to be positive while avoiding strongly negative samples, and repeats this process iteratively.

If key values are found, the method 300b generates binary variables for the most frequent values of categorical variables and normalizes continuous (non discrete) variable features by subtracting the mean and dividing by the standard deviation, step 334.

In the illustrated embodiment, the method 300b then extracts features of the virtualized data utilizing a plurality of engines, step 338. For example, in the context of small office or home office links, the method 300b extracts features such as the total call volume, total volume to business numbers, SMS count, SMS percentage, mean and standard deviation of call length, roaming activity, and other various features related to small or home office links. If training data remains, step 340, the method 300b continues analyzing the remaining training data.

The method 300b then normalizes the training data, step 344. In the illustrated embodiment, the method 300b computes a histogram for each of the selected features and analyzes the signal as a rolling baseline with peaks. The method 300b sets up the model of analyzing this function as an optimization problem, and solves for the peaks in the signal which when convolved with a kernel and added to a smooth baseline signal result in the features histogram. The histogram is then compared with a similar histogram built for the external (interlink/execution) data and a transfer function is built between the two histogram. Comparing histograms is discussed more fully with respect to FIG. 4. In an alternative embodiment, normalizing the training data comprises adding a bias to the training data and multiplying the bias by a factor such that the training data has the same mean and variance as features computer from the execution data.

The method 300b then selects the most significant features for the virtualized training data, step 346. In one embodiment, the method 300b takes multiple subsets of samples from the intralink data and re-computes training model coefficients for each subset. A small ratio between the absolute value of the secondary features mean and its standard deviation indicates that a feature is unstable. For each feature selected the method 300b computes the feature correlation and mutual information with the response in order to measure the dependence between the feature and response.

The method 300b then trains the intralink data model, step 348. The method 300b utilizes various classifiers including, but not limited to, least angle regression (LARS), L1 logistic regression, rare boost, and random forests. Finally, the method 300b optimizes the weights of a linear mixture of all of the classification results, step 350. In one embodiment, the method 300b uses ridge regression for finding the optimal mixture. In alternative embodiments, the method 300b maintains a subset of the training data for subsequent testing of the trained model. Each of the preceding algorithms may classify the testing data, and the prediction result of each algorithm is compared to the testing data. By utilizing a testing data set, the method 300b may then identify a linear mix of predictions that provides the optimal prediction result on the testing data.

Figure 4:
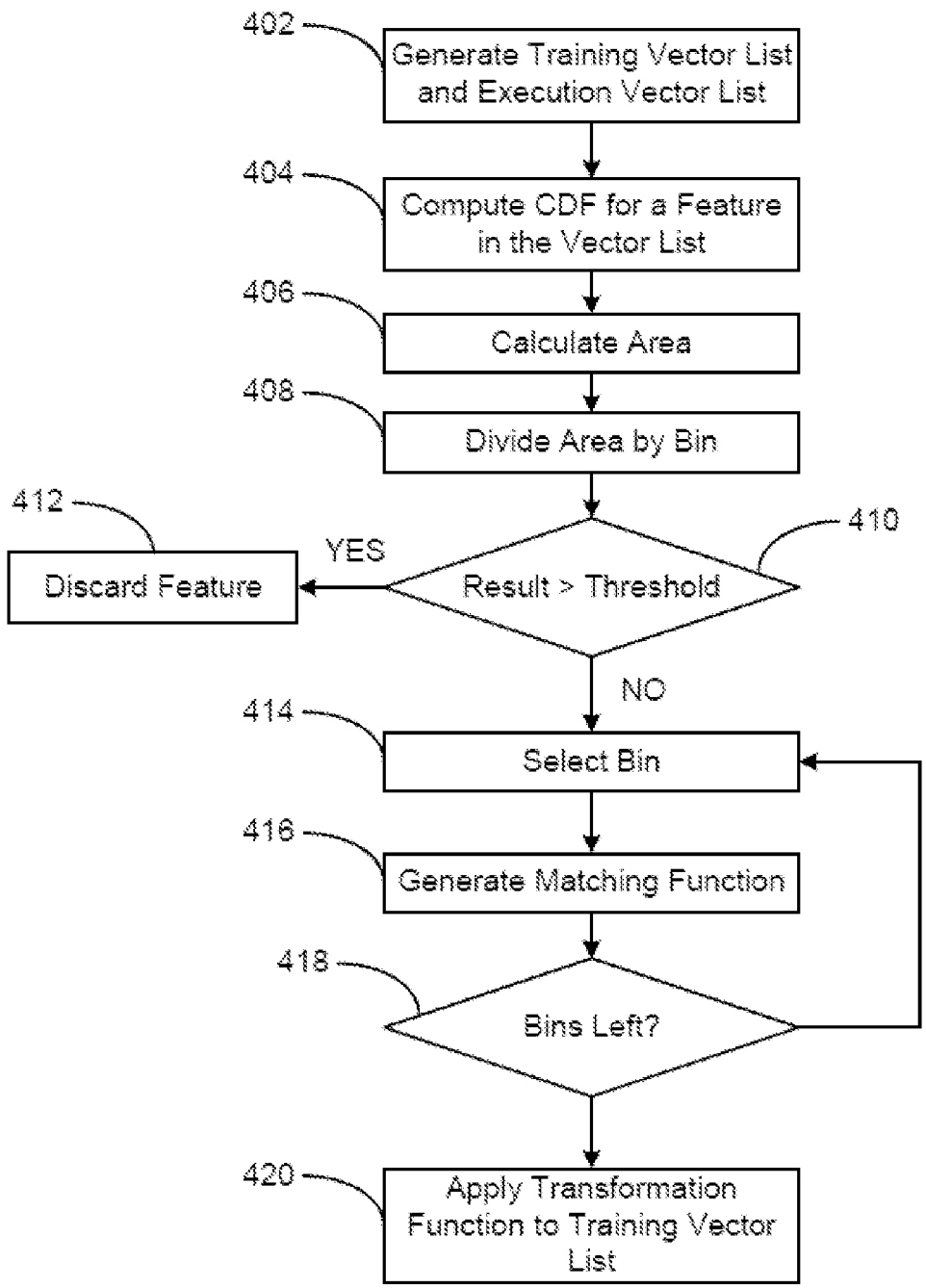
FIG. 4 presents a flow diagram illustrating a method for remediating differences between a customer acquisition training set and execution set according to one embodiment of the present invention.

FIG. 4 presents a method for remediating differences between a customer acquisition training set and the set for which predictions should be made (execution set) according to one embodiment of the present invention. According to the embodiment that FIG. 4 illustrates, a method 400 generates a training feature vector list and an execution feature vector list, step 402. In the illustrated embodiment, a vector list includes a plurality of metrics associated with a given domain. In the illustrated embodiment, the number of vector lists should be greater than a predetermined threshold (e.g., 10,000 vectors) and be representative of a larger data set.

The method 400 then calculates the cumulative distribution function (CDF) for a feature in the vector list, step 404. After calculating the CDF for a feature in the training and execution vector list, the method 400 calculates the area between the two CDF curves, step 406. The calculated area is then divided by the number of bins, step 408. In the illustrated embodiment, the number of bins corresponds to the x-axis of the CDF. If the resulting number is greater than a predetermined threshold, step 410, the method discards the feature, step 412.

If the method 400 determines that the result is less than a predetermined threshold, the method 400 selects a given bin, step 414, and generates a matching function for the given bin, step 416. In the illustrated embodiment, for each bin in the training vector, the method 400 finds the bin value in the execution vector where $F_1(B_1)=F_2(B_2)$, where $F_1$ and $F_2$ correspond to the training vector and execution vector, respectively. The method 400 determines if any bins are left in the vector, step 418, and repeats steps 414 and 416 for the remaining bins. By generating the matching functions, the method 400 effectively generates a transformation function to be applied to future values of the feature in the training vector list. After the method 400 generates this transformation function, the method 400 applies the transformation function to the training vector, step 420. Using interpolation any value can be transformed, even though the matching function works on bins. Vector list rows containing values that are out of range are discarded.

Figures 5A, 5B:
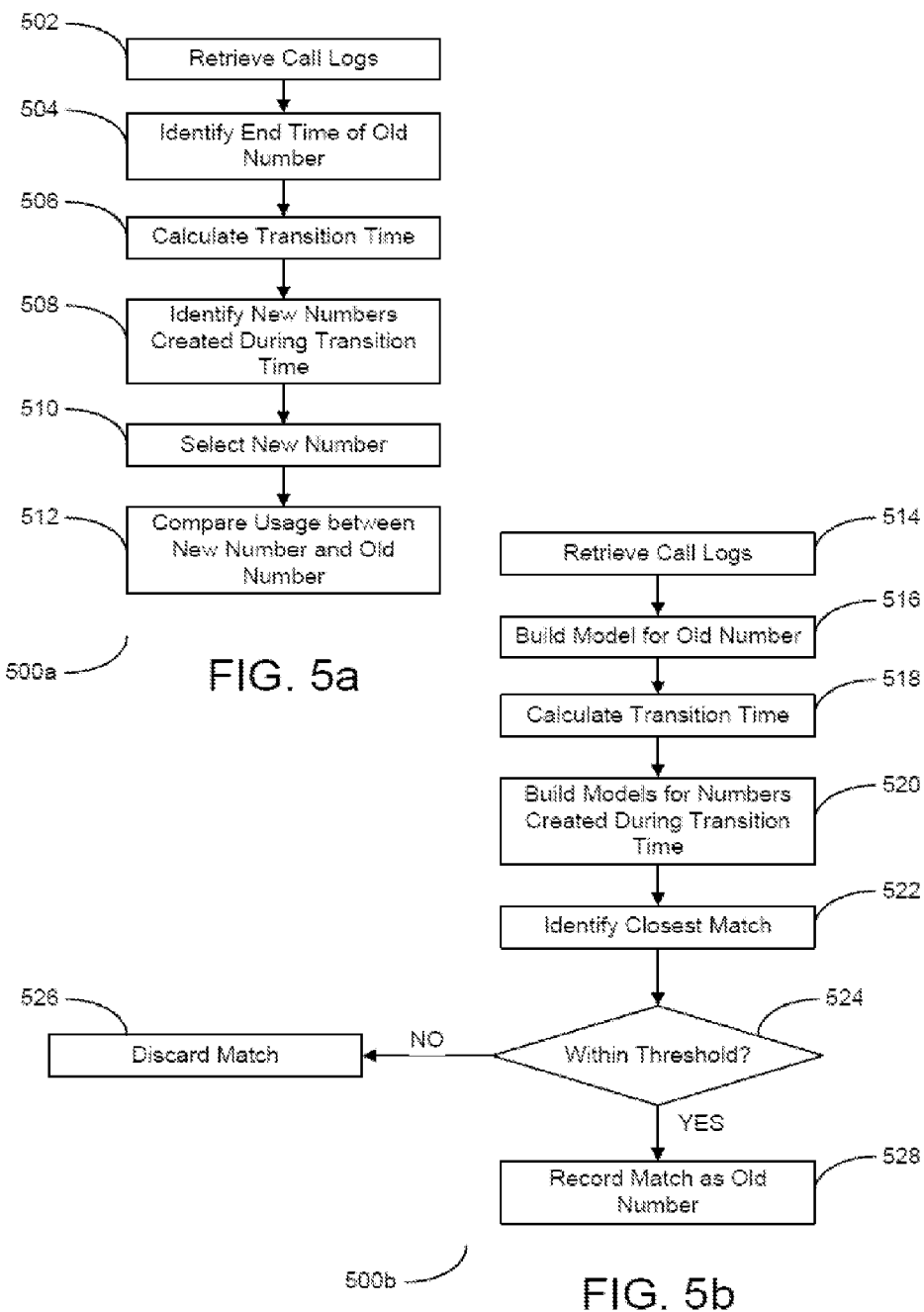
FIGS. 5a and 5b present flow diagrams illustrating a method for detecting the exchange of phone numbers from one telecom provider to another according to one embodiment of the present invention.

FIGS. 5a and 5b present flow diagrams illustrating methods for detecting the exchange of phone numbers from one telecom provider to another according to one embodiment of the present invention. According to the embodiment that FIG. 5a illustrates, the method 500a retrieves call logs, step 502. In the illustrated embodiment, call logs contain various data regarding calls made between telephones including telephone numbers, call times, and call dates. In alternative embodiments, call logs contain various other data including data regarding SMS, MMS, and Internet data between telephones. In the illustrated embodiment, the method 500a may be applied to internal nodes, external nodes, or a combination thereof. In the illustrated embodiment, external nodes may be enriched with predicted information. For example, the methods 500a and 500b may use predicted nodes output from the method of FIG. 3.

The method 500a then identifies the end time of the old number subscription at the operator's network, based on the call logs, step 504. In the illustrated embodiment, the method 500a filters the logs to identify only those logs indicating outgoing or incoming calls from the old telephone number. The method 500a then sorts the list of outgoing calls to determine the last date the phone was used. The method 500a then calculates a transition time, step 506. In one embodiment, the method 500a estimates a transition period based on historical data. In one embodiment, the method 500a analyzes historical data of number exchanges to estimate a transition period. In one embodiment, the transition time is a sharp time window at a size of a day or even an hour or it can be represented as a parameter to a distribution to the actual transition time. For example, the parameter can be the start time of a time-window of five days with lower probability for two days before and after this window.

After determining the transition time, the method 500a identifies all new numbers created during the transition time, step 508. In the illustrated embodiment, the method 500a accesses CRM data to determine the created numbers during the transition period. Alternatively, the method 500a utilizes the log entries to determine all new numbers created in the transition time.

The method 500a then selects one of the identified new numbers, step 510, and compares the usage of the new number to the old number, step 512. In one embodiment, the method 500a analyzes the incoming and outgoing call data of the old and new numbers to determine the likelihood of a match between the new and old number. If the method 500a determines that there is a high likelihood of a match between the new and old numbers, the method 500a records the number exchange. If not, the method 500a continues to analyze the remaining numbers. If no number is found, the method 500a indicates that no match was found.

According to the embodiment that FIG. 5b illustrates, a method 500b retrieves call logs, step 514. In the illustrated embodiment, call logs contain various data regarding calls made between telephones including telephone numbers, call times, and call dates. In alternative embodiments, call logs contain various other data including data regarding SMS, MMS, and Internet data between telephones.

The method 500b generates a model for the old phone number, step 516. In the illustrated embodiment, building a model for the old phone number includes analyzing the data associated with the old phone number and teaching a learning machine, SVM, or similar learning mechanism. The method 500b generates the model in a manner similar to the methods previous discussing learning machines.

Similar to method 500a, the method 500b calculates a transition time period, step 518. In the illustrated embodiment, the method 500b accesses CRM data to determine the created numbers during the transition period. Alternatively, the method 500b utilizes the log entries to determine all new numbers created in the transition time.

The method 500b then build a model for each of the identified new numbers, step 520. As previously discussed, the method 500b utilizes various learning machine classifiers to generate and validate a model for each number. One example of such a model is based on the distribution of number of calls in different hours of the day. Another example of such a model is one that keeps track with which other numbers the old phone numbers have had most of its calls. When keeping track of links with individual numbers, such as the favorite numbers described, many parameters are used such as weight or balance and in addition it is possible to model the distribution of these parameters over time. In one embodiment, the weight of a link includes the number of communications transactions of the link during a period of time. The weight parameter takes into account all communication types such as voice, short message service (SMS), multi-media messaging service (MMS) and instant messaging (IM), etc., and may include a weighted sum of all network events between the two numbers of the link. In one embodiment, the balance of a link includes the direction of phone traffic, so for example; if there are an equal number of calls between the two numbers of a link in both directions, the balance is zero. The value of balance is equal to one (1) if traffic is only in one direction or minus one (−1) if the traffic is only in the other direction. Alternatively or in addition, balance also includes the duration of calls between the telephone numbers of the link. In alternative embodiments, the method 500b combines several simpler models into one complex model. Alternatively, the method 500b builds a model with time weights, assigning higher importance to information collected near the transition.

The method 500b then identifies the closest match between the old number model and the plurality of new models, step 524. In one embodiment, the method 500b measures the distance between all the new models and the old model. An example such a measurement will be to use the Kullback-Leibler divergence. In one embodiment, the method 500b improves the distance measure by giving different weights to different start times of the new phone number. The new phone number with the best distance measure is taken as the candidate for the number that has replaced the old phone number.

If the identified match is below a predetermined threshold, step 524, the method 500b discards the new number, step 526. Conversely, if the identified match is above a predetermined threshold the method 500b records the match as a new version of the old number, step 528. In the illustrated embodiment, the methods 500a and 500b ensure that the old phone numbers are not within the provider's network but the new phone number is(or vice versa). In this case the model built for the old number will be skewed since it will not contain calls made to numbers outside the provider. In alternative embodiments, methods 500a and 500b are employed only on a data set comprising new and old numbers associated with a single service provider.

As can be seen, the methods 500a and 500b are operative to determine when a customer has changed telephone numbers. The methods 500a and 500b in the context of determining properties of external nodes by refining a training set used, for example, by FIG. 3. In one embodiment, the method of FIG. 3 may utilize the numbers detected by the methods 500a and 500b to determine that two nodes should be treated the same as a single node, as they are associated with the same customer. By using the methods 500a and 500b, the method of FIG. 3 may further refine the trained model by eliminating extraneous data.

Figure 6A:
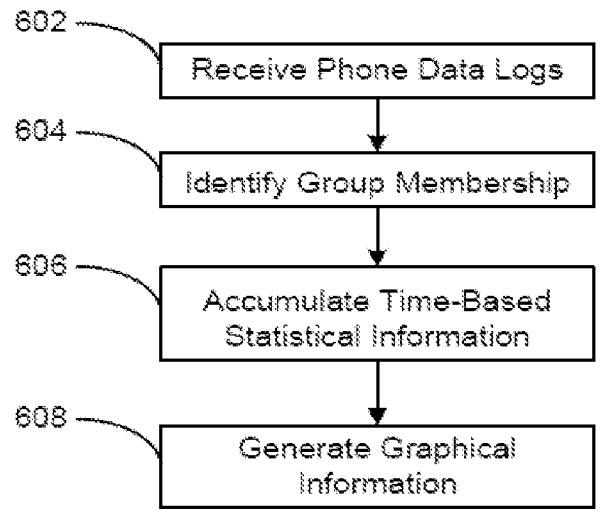
FIG. 6a presents a flow diagram illustrating a method for generating time-based statistical databased on phone records according to one embodiment of the present invention.

FIG. 6a presents a flow diagram illustrating a method for generating time-based statistical databases on phone records according to one embodiment of the present invention. According to the embodiment that FIG. 6a illustrates, a method 600a receives a plurality of phone data logs, step 602, as previous discussed. The method 600a then identifies an appropriate group for each individual record, step 604. Identifying a group for a given phone record can be accomplished in a plurality of ways including, but not limited to, statistical analysis and trained algorithms. In alternative embodiments, the method 600a utilizes various external data source for identifying group membership including, but not limited to, social networking information, CRM data, and location data.

For each group, the method 600a accumulates time-based statistical information, step 606. In the illustrated embodiment, statistical information is accumulated and arranged according to a predefined temporal interval. For example, the method 600a may generate a plurality of statistics per hour. After generating the relevant time-based statistics, the method 600a generates graphical information, step 608. In the illustrated embodiment, the method 600a presents the statistical, group data in a manner suitable for viewing or presenting.

Figure 6B:
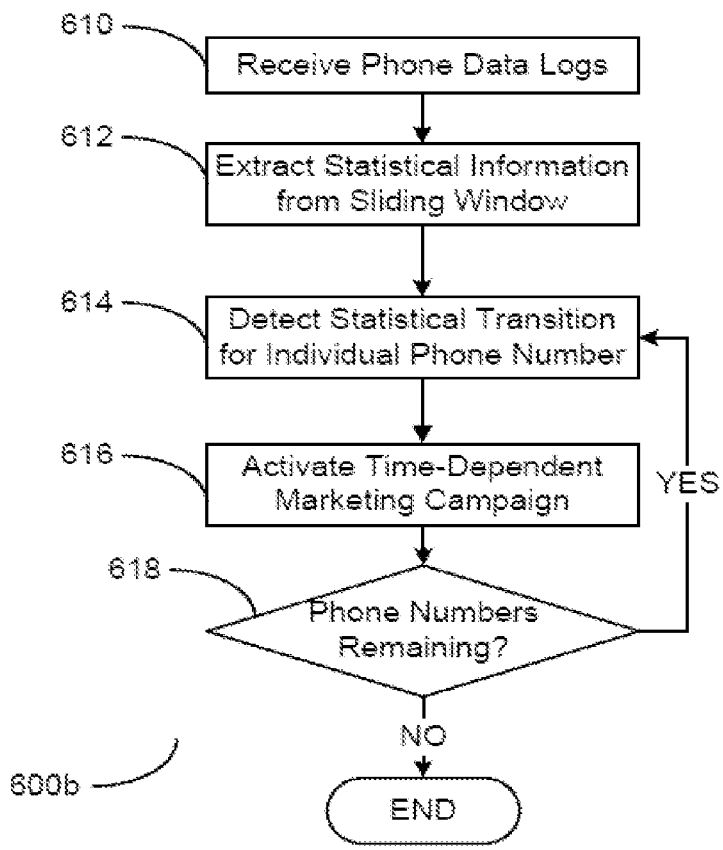
FIG. 6b presents a flow diagram illustrating a method for activating a time-based marketing campaign based on historical phone record data according to one embodiment of the present invention.

FIG. 6b presents a flow diagram illustrating a method for activating a time-based marketing campaign based on historical phone record data according to one embodiment of the present invention. According to the embodiment that FIG. 6b illustrates, a method 600b receives phone data logs, step 610, as previous discussed. The method 600b then extracts statistical information, as previously discussed, using a sliding window, step 612. In the illustrated embodiment, a sliding window includes sampling the phone data across time.

While the method 600b extracts statistical information, the method 600b detects statistical transitions falling within the sliding window, step 614. For example, the method 600b may be configured to identify when a steady stream of statistical data suddenly changes, e.g., a period of sparse text messaging to a period of heavy text messaging. If the method 600b detects such a transition, the method 600b activates a time-dependent marketing campaign, step 616. In one embodiment, the method 600b stores time-related information associated with the campaign and the phone number, such that the campaign is launched at a predetermined future time. Finally, the method 600b continues detecting transitions for the remaining phone numbers, step 618.

Figure 6C:
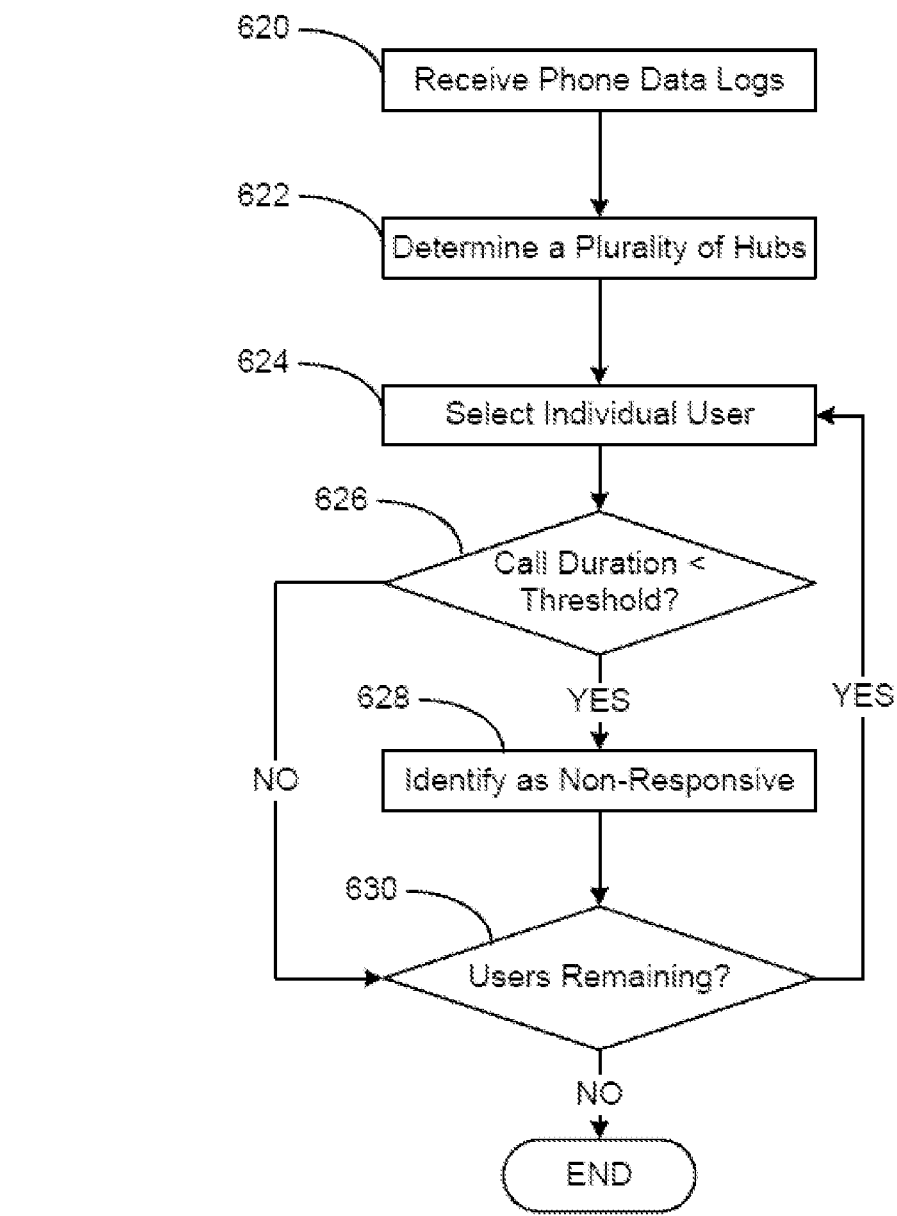
FIG. 6c presents a flow diagram illustrating a method for identifying non-responsive telemarketing recipients according to one embodiment of the present invention.

FIG. 6c presents a flow diagram illustrating a method for identifying non-responsive telemarketing recipients according to one embodiment of the present invention. According to the embodiment that FIG. 6c illustrates, the method 600c receives a plurality of phone data logs, step 620, as previously described. The method 600c next identifies a plurality of hubs, step 622. As previously discussed, a hub is a phone user generating many outgoing calls. In one embodiment, the method 600c analyzes the phone data logs to determine the presence of hubs. In an alternative embodiment, the method 600c is supplied with a predetermined list of hubs.

For each hub, the method 600c selects an individual user identified as an outgoing call of the selected hub, step 624. The method 600c determines if the call from the hub to the individual user is less than a predetermined temporal threshold, step 626. In one embodiment, the threshold is a null value indicating the call was unanswered. In an alternative embodiment, the threshold is a small time value indicating that the user answered the call and hung up immediately. If the method 600c determines that the call was longer than the threshold, the method 600c determines whether any users remain to be inspected, step 630. If so, the method 600c analyzes the remaining users. In some embodiments, the method 600c may utilize a flag indicating the call was unanswered, as opposed to a null value.

If the method 600c determines that the call was shorter, the method 600c identifies call as non-responsive, step 628, and continues to analyze the remaining users, step 630. In one embodiment, identifying a call as non-response includes adding the user to a list of unresponsive callers.

Figure 6D:
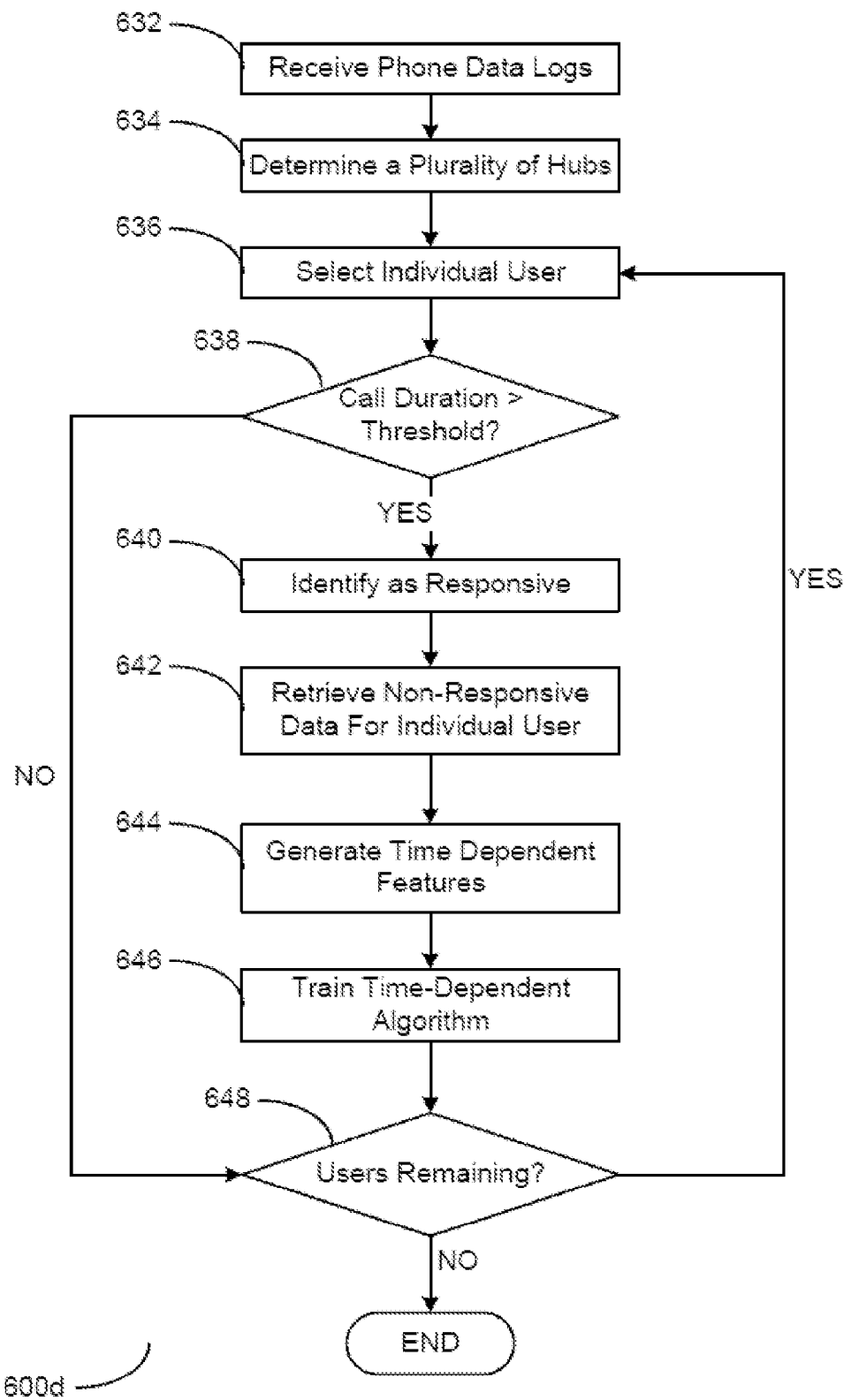
FIG. 6d presents a flow diagram illustrating a method for training an algorithm based on time-based responsive and nonresponsive caller data according to one embodiment of the present invention.

FIG. 6d presents a flow diagram illustrating a method for training an algorithm based on time-based responsive and nonresponsive caller data according to one embodiment of the present invention. According to the embodiment that FIG. 6d illustrates, the method 600d receives a plurality of phone data logs, step 632, as previously described. The method 600d next identifies a plurality of hubs, step 634. As previously discussed, a hub is a phone user receiving many outgoing calls. In one embodiment, the method 600d analyzes the phone data logs to determine the presence of hubs. In an alternative embodiment, the method 600c is supplied with a predetermined list of hubs.

For each hub, the method 600d selects an individual user identified as an outgoing call of the selected hub, step 636. The method 600d then determines if the call from the hub to the individual user is less than a predetermined temporal threshold, step 638. In one embodiment, the threshold is a null value indicating the call was unanswered, in the alternative, the threshold is a small time value indicating that the user answered the call and hung up immediately. In some embodiments, the method 600d may utilize a flag indicating the call was unanswered, as opposed to a null value.

If the method 600d determines that the call was shorter than the threshold, the method 600d determines whether any users remain to be inspected, step 648. If so, the method 600d analyzes the remaining users.

If the method 600d determines that the call was longer than the predetermined threshold, the method 600d identifies call as responsive, step 640. Additionally, the method 600d retrieves non-responsive data for the selected individual user, step 642. In one embodiment, the method 600d retrieves non-responsive data identified in FIG. 600c.

Based on the responsive and non-responsive data, the method 600d generates time dependent features associated with the individual user, step 644. For example, the method 600d may associate a plurality of times with times when the user will answer the phone and a plurality of times with times when the user will ignore phone calls. Using this information, the method 600d trains a time-dependent algorithm, step 646. For example, a time-dependent algorithm may use the time-dependent features to schedule calls to a given user. In the illustrated embodiment, the method 600d may be re-executed for a plurality of responsive and non-responsive call associated with a selected user.

In the illustrated embodiments, the methods a-d may be utilizes as part of a market intelligence application, as discussed with respect to FIG. 2. According to various embodiments, the methods 600a-d may be employed on external nodes. In alternative embodiments, the methods 600a-d may be employed on internal nodes. In yet another alternative, the methods 600a-d may be employed on a combination of internal and external nodes. When employed on external customers, the methods can be used to determine the date and time in which calling the non-customer will have the maximal expected success in converting the non-customer to a customer.

Figure 7A:
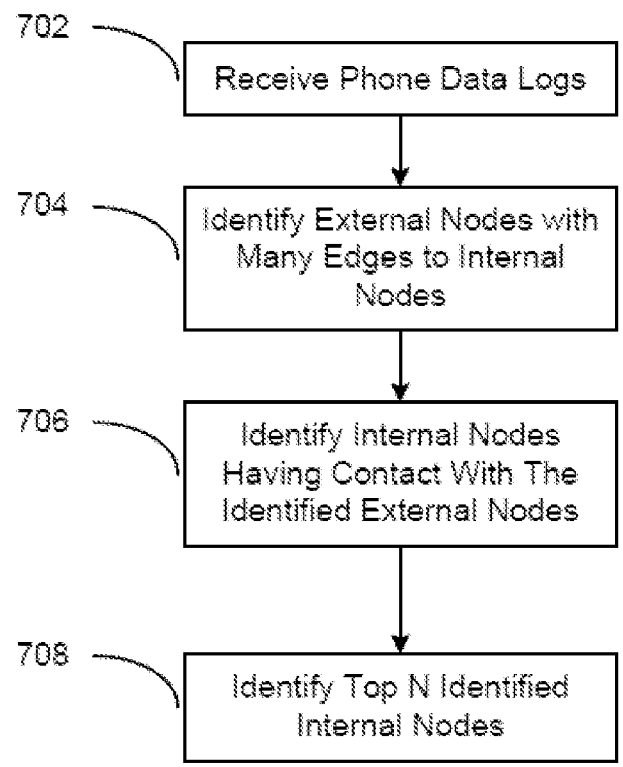
FIG. 7a presents a flow diagram illustrating a method for detecting potential customer acquisitions according to one embodiment of the present invention.

FIG. 7a presents a flow diagram illustrating a method for detecting potential customer acquisitions according to one embodiment of the present invention. According to the embodiment that FIG. 7a illustrates, a method 700a receives a plurality of phone data logs, step 702, as previous discussed.

The method 700a parses the phone data logs to identify external nodes having many edges (e.g., external hubs) connecting to internal nodes, step 704. In the illustrated embodiment, an external node includes a customer of a competitor telecom provider, whereas an internal node includes a current customer of the telecom provider employing method 700a. In one embodiment, an edge between an external and internal node represents phone or data communications between the nodes such as voice or text messaging communications as well as Internet data traffic between the nodes.

After identifying the external nodes in step 704, the method 700a identifies a plurality of internal nodes that are connected to the external nodes, step 706. In the illustrated embodiment, these internal nodes are identified by analyzing the phone records received in step 702. By identifying the plurality of connected internal nodes, the method 700a identifies potential internal customers that may potentially be acquired by a rival telecom provider providing service to the external hubs.

After identifying the plurality of internal nodes, the method 700a identifies the top N internal nodes, step 708. In the illustrated embodiment, the top N nodes are determined based on a predefined limit of internal nodes. In alternative embodiments, the top N results are statistically determined based on the characteristics of the internal nodes. For example, the provider utilizing the method 700a may determine that only those internal nodes have a specific weight or balance value (discussed previously) constitute potential acquisitions of the rival provider.

Figure 7B:
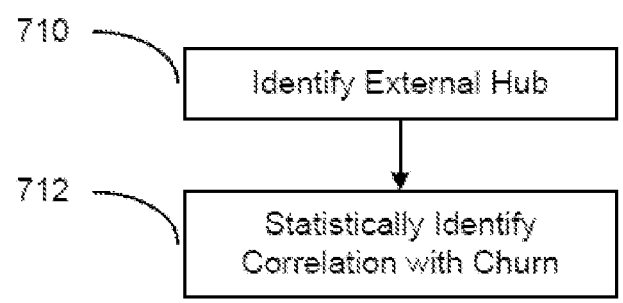
FIG. 7b presents a flow diagram illustrating a method for associating potential customer churn based on incoming and outgoing call data according to one embodiment of the present invention.

FIG. 7b presents a flow diagram illustrating a method for associating potential customer churn based on incoming and outgoing call data according to one embodiment of the present invention. According to the embodiment that FIG. 7b illustrates, a method 700b identifies a plurality of external hubs, step 710. Identifying a plurality of external hubs includes similar to steps to that of FIG. 7a.

Differing from FIG. 7a, the method 700b statistically correlates churn with the external hubs, step 712. In the illustrated embodiment, churn represents the acquisition of a provider's customers by rival providers. In the illustrated embodiment, the method 700b utilizes statistical methods to correlate churn with potential internal nodes connected to the external hubs. In alternative embodiments, the method 700b employs an SVM or similar means to analyze the connections between the external hubs and the internal nodes and generate a predictive model to identify which internal customers are subject to churn.

As can be seen in the preceding descriptions, the methods 700a and 700b may be utilize to predict customers with a high churn potential. In this embodiment, the methods 700a-b, may be utilized to populate a property of a customer node indicating that the user has a high churn potential. Using this property, a method for identifying customer leads (e.g., the method of FIG. 3) may utilize identified external nodes having a high number of connections to known acquired nodes. In this example, the external nodes represent customers that have a high acquisition likelihood due to their direct, or indirect, connections with previously acquired nodes.

Figure 8:
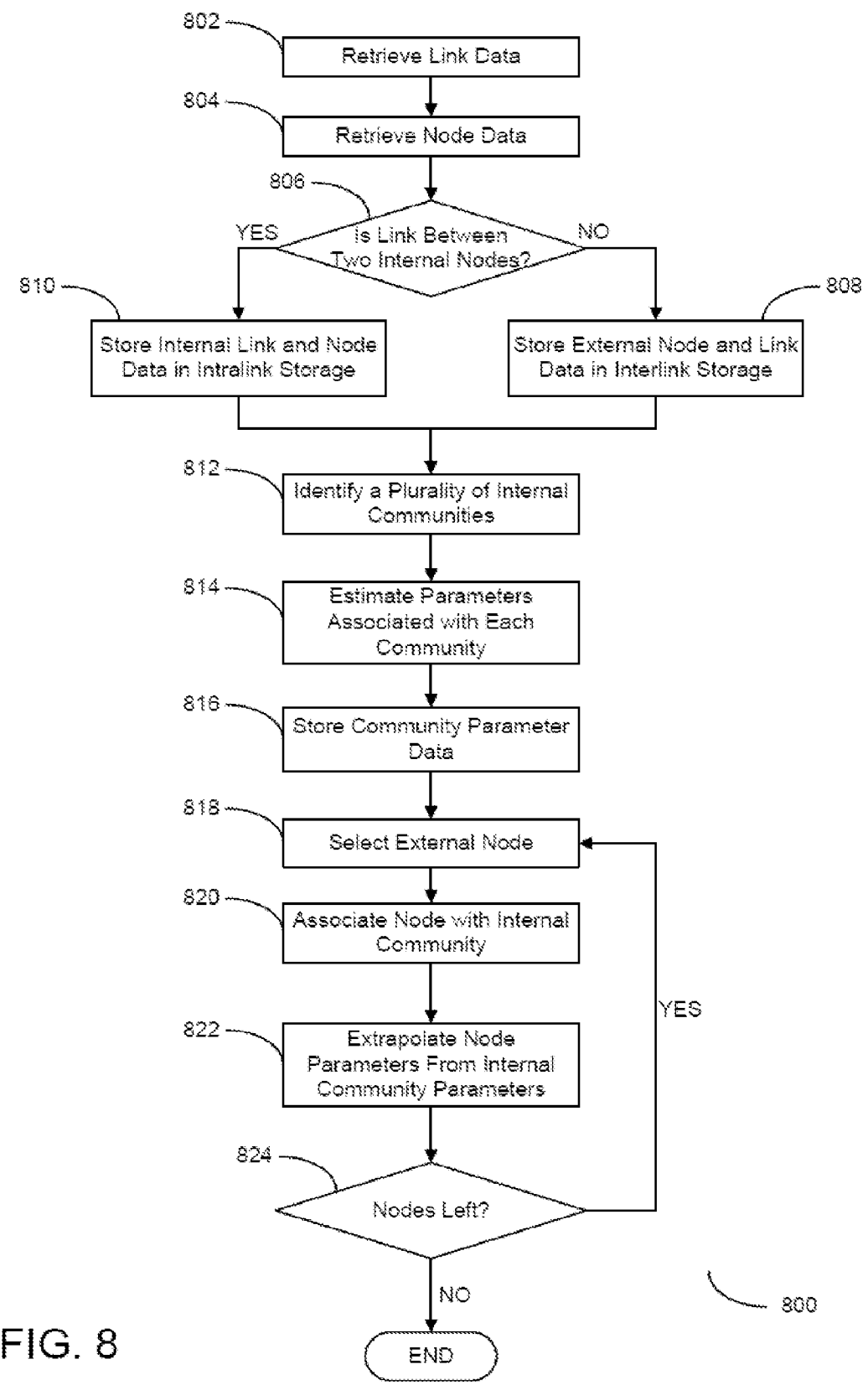
FIG. 8 presents a flow diagram illustrating a method for statistically analyzing node data in the context of node communities according to one embodiment of the present invention.

FIG. 8 presents a flow diagram illustrating a method for statistically analyzing node data in the context of node communities according to one embodiment of the present invention. According to the embodiment FIG. 8 illustrates, a method 800 receives link data, step 802. In the illustrated embodiment, link data includes information regarding telecommunications between individuals or businesses. Link data includes date and time information, duration information, telephone number information (caller and receiver), directional information, etc. In the illustrated embodiment, the method 800 obtains link data from a database of call records stored by a telecom provider. In the illustrated embodiment, the method 800 may utilize both internal or external nodes, or a combination thereof.

In the illustrated embodiment, the method 800 retrieves node data, step 804. In the illustrated embodiment, node data includes information regarding the caller or receiver associated with a given link received in step 802. In one embodiment, node data is only be available to internal nodes, that is, customers of the provider. Alternatively, node data further includes predicted node data for external nodes. In one embodiment, the retrieved node data is a subset of a superset of internal node data.

After retrieving the node and link data, the method 800 determines if the received link data is between two internal nodes, step 806. In the illustrated embodiment, a link between two nodes corresponds to a telephone call or other transmission between two customers of the provider. Conversely, a link between an external node and an internal node corresponds to a transmission between a customer and a non-customer.

If the method 800 determines the link is between an internal node and an external node, step 806, the method 800 stores the link in an interlink data storage, step 808. Alternatively, if the method 800 determines the link is between two internal nodes, the method stores the link in an intra-link data storage, step 810.

If the method 800 identifies a plurality of internal communities, step 812. In the illustrated embodiment, the method 800 performs various network analyses on the links between internal nodes to determine whether a "community" exists. A community includes a subnet of the total internal network. For example, a community includes a central hub node and various spoke nodes. In the telecom field, an example of a community would be a school as the hub and students as the spokes. The method 800 determines that such a community exists by first identifying the hub (e.g., using provider data, external data source, or be identifying phone number receiving many calls) and then analyzing the incoming telephone calls to the school. The method 800 then uses a plurality of parameters to determine which nodes in the network are students. For example, the method 800 identifies all those nodes associated with families who called the school during a certain time period during weekdays (e.g., between 8 A.M. and 5 P.M.). In this example, each node exhibiting these characteristics will then be identified as students, and along with the school, these nodes will be classified as a "school" community. Although illustrated as a hub-and-spoke network, various other network topologies may be utilized to detect the presence of communities.

After identifying a plurality of communities, the method 800 estimates parameters associated with the community, step 814. For example, after determining the community, the method 800 extrapolates the size of the overall community. Alternatively, the method 800 employs various learning machines to generate a model of the identified community. After estimating the parameters associated with the community, the method 800 stores the parameters and community data, step 816, for later retrieval and analysis.

Once the method 800 generates a plurality of communities, the method 800 selects the previously identified external nodes, step 818. The method 800 then attempts to associate the external node with an identified community, step 820. In one embodiment, the method 800 employs various predictive techniques to correlate the external node behavior with known behavior of nodes in a previously identified community.

After identifying a community that the external node is likely to belong to, the method 800 extrapolates parameters from the internal community parameters, step 822. In one embodiment, the method 800 estimates the integrated total value of the external node after identifying the node's community. The integrated total value includes an estimate of the earning generated by a node more accurate than the sum all the node's billing information. In an alternative embodiment, the method 800 may utilize the location of the identified nodes to determine a spatial relationship representing a community. In alternative embodiments, the method 800 may bypass the step of extrapolating parameters from the internal community parameters. The method 800 then repeats steps 818, 820, and 822 for any remaining nodes, step 824.

Figure 9:
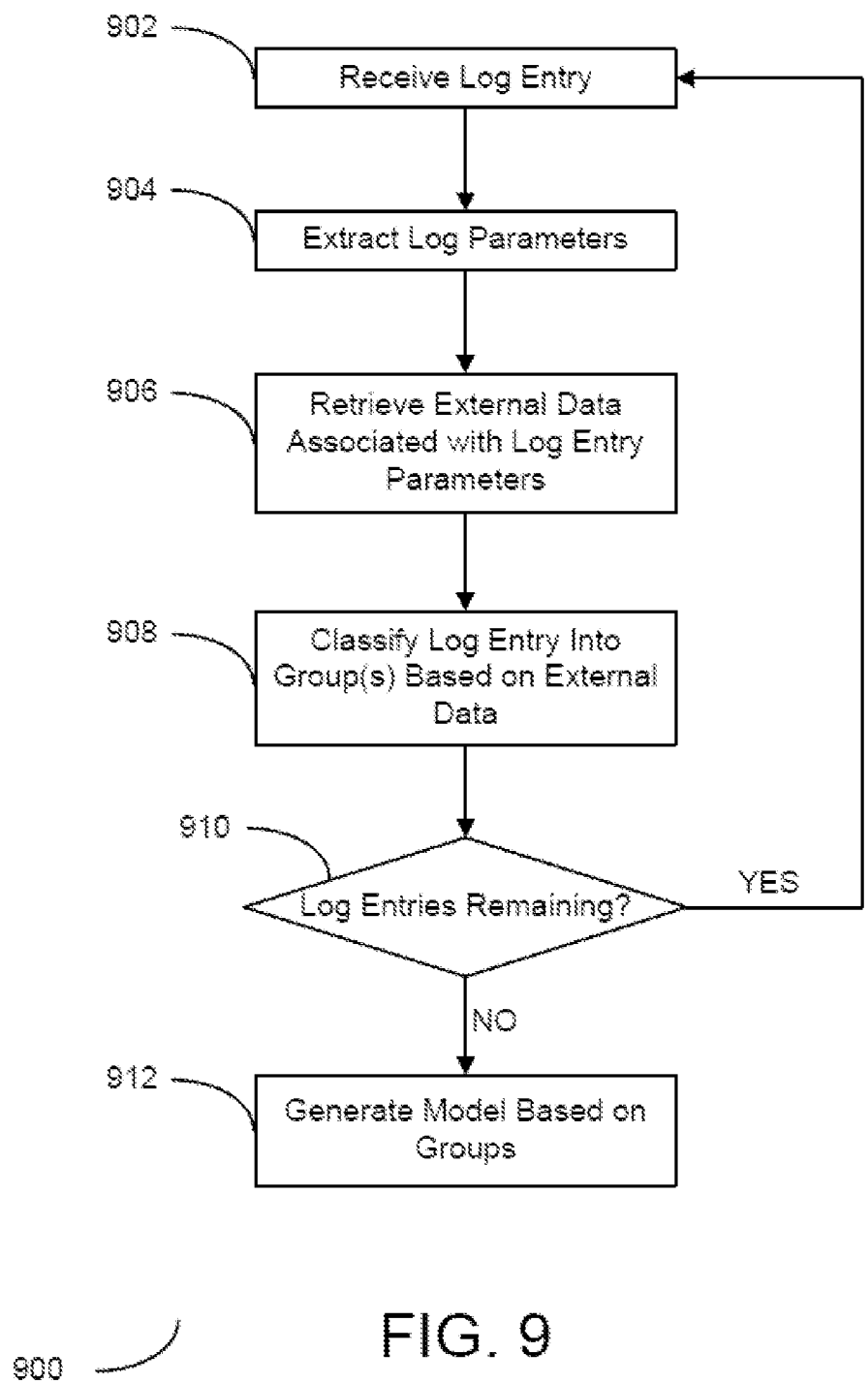
FIG. 9 presents a flow diagram illustrating a method of modeling link data according to one embodiment of the present invention.

In the illustrated embodiment, the method 800 may output a plurality of external nodes containing extrapolated community parameters. As can be seen, the method 800 utilizes the known properties of internal nodes to estimate parameters for external nodes with missing data. Based on this extrapolation, the method 800 may be used to augment a training set in order to further identify new, external nodes' properties, e.g., through the process described with respect to FIGS. 2 and 3. In alternative embodiments, FIG. 9 presents a flow diagram illustrating a method of modeling link data according to one embodiment of the present invention. According to the embodiment that FIG. 9 illustrates, the method 900 receives a log entry, step 902. The method 900 then extracts log parameters from the log entry, step 904. In one embodiment, a log entry includes a record of node-to-node communications. For example, in the telecom field, log parameters include the receiving and dialing phone numbers, the date of the call, and the time of the call, etc.

The method 900 then retrieves external data associated with the log entries, step 906. In various embodiments, external data includes a plurality of data records relevant to the log data. Examples of external data include social network data, customer relationship management (CRM) data, location data, known interest group data, or police, university, or hospital data, etc. In one embodiment, social networking data is generated as previously discussed with respect to FIG. 8. Alternatively, data such as police, university, or hospital data is generated from external sources.

The method 900 attempts to classify the log entry based on the external data, step 908. In the illustrated embodiment, the method 900 analyzes the received log parameters to determine whether the log data entry corresponds to a given group identified by the external data. For example, if the external data includes a list of businesses, the method 900 inspects the log data to determine which calls have been made to the businesses. Those callers frequently calling a single business are identified as customers of the business and thus form a group.

Although the method 900 explicitly illustrates classifying and modeling as distinct steps (i.e. grouping of links into groups or building a model which can be used to classify future links into groups) it is possible to perform grouping without any modeling and it is also possible to model without actually grouping all the links. In this embodiment, grouping and modeling are performed in parallel and at the same time using for example known methods of statistical classifiers.

After identifying which log entries are members of a given group, the method 900 generates a model for each of the groups, step 912. In the illustrated embodiment, the method 900 uses a linear classification algorithm to build support vector machine (SVM), similar to the learning machine described with respect to FIG. 3. Viewing input data as two sets of vectors in an n-dimensional space, an SVM constructs a separating hyperplane in that space, one which maximizes the margin between the two data sets. To calculate the margin, the method 900 constructs two parallel hyperplanes, one on each side of the separating hyperplane, which are "pushed up against" the two data sets. The method 900 determines an adequate separation that is achieved by the hyperplane and has the largest distance to the neighboring data points of both classes, since in general the larger the margin the lower the generalization error of the classifier. In alternative embodiments, the method 900 generates a model using a mixture of boosting and random-forest algorithms. In one embodiment, the method 900 may be utilized to supplement node-to-node communications analyzed in an Internet environment, for example, in the method of 1100. In alternative embodiments, the method 900 may be utilized as part of a market intelligence (MI) or filtering system, as described with respect to FIG. 2.

Figure 10:
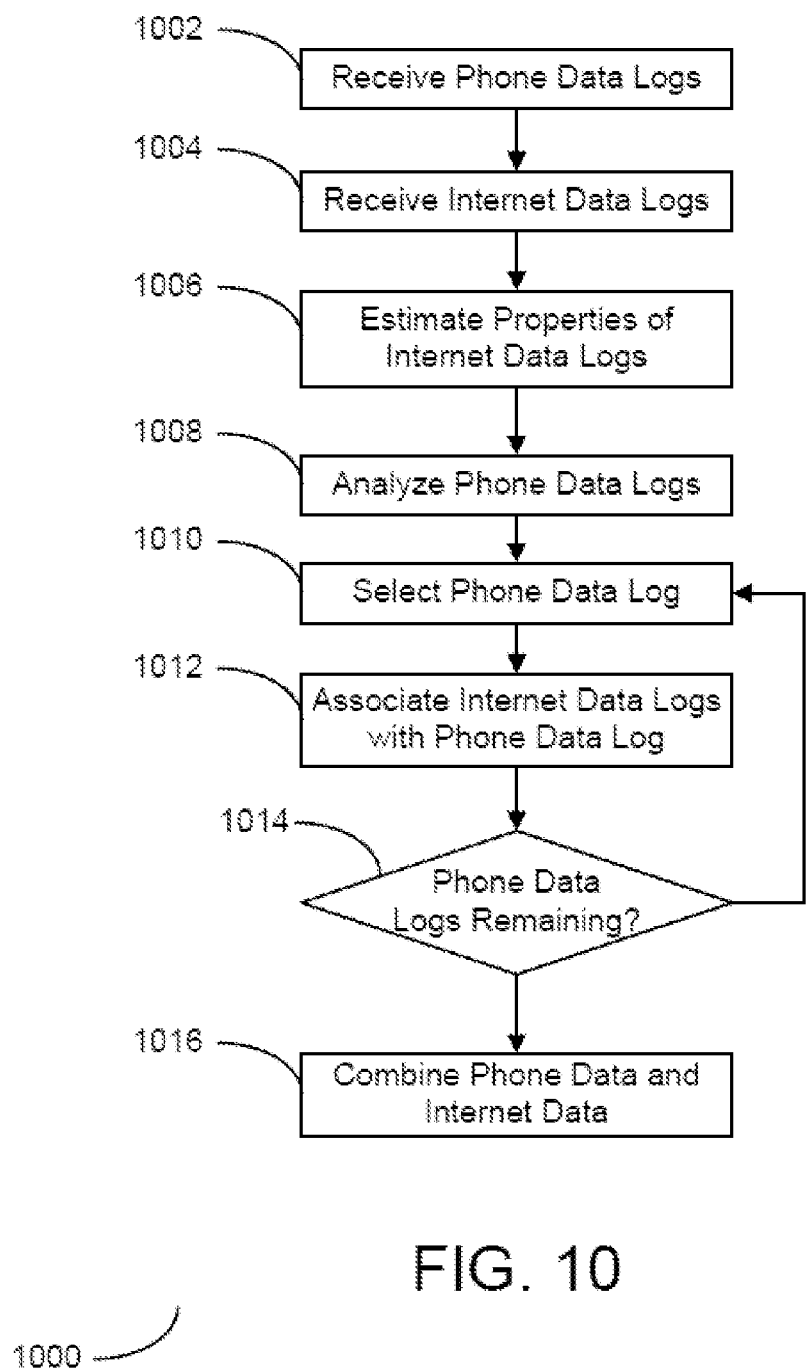
FIG. 10 presents a flow diagram illustrating a method for profiling mobile phone users according to one embodiment of the present invention.

FIG. 10 presents a flow diagram illustrating a method for profiling mobile phone users according to one embodiment of the present invention. As the embodiment that FIG. 10 illustrates, a method 1000 receives phone data logs, step 1002, as previously discussed. Additionally, the method 1000 receives Internet data logs, step 1004. In one embodiment, phone data logs include only internal phone data logs. In alternative embodiments, phone data logs includes both internal and external data.

The method 1000 then estimates properties of a mobile user based on the Internet data records associated with the user's phone, step 1006. In the illustrated embodiment, estimated properties include, but are not limited to, properties such as the user's age, income level, gender, etc. The method 1000 estimates these properties by analyzing the Internet activity (e.g., sites visited). For example, the method 1000 determines that users accessing the Wall Street Journal website and Men's Journal website are male users between the ages of 21 and 45 who enjoy fitness-related activities.

The method 1000 then analyzes the phone data logs to estimate properties about the mobile users associated with a given phone number, step 1008. In the illustrated embodiment, the method 1000 makes similar determinations as described with respect to step 1006. For example, the method 1000 will determine that a user sending SMS or MMS messages between the hours of 10 P.M. and 12 A.M. and having little or no activity between 8 A.M. and 4 P.M. may represent a teenager.

After making the aforementioned determinations, the method 1000 selects a given phone data log, step 1010, and associates the Internet data logs with the phone number in the phone data log, step 1012. In the illustrated embodiment, the matching of Internet data with phone data includes identifying phone data logs and Internet data logs originating or terminating at the same cellular phone device which is used both to make calls and to access the Internet. The method 1000 continues to parse the identified phone numbers until no phone numbers remain, or a predefined threshold is met, step 1014.

Once the method 1000 associates phone numbers with phone and Internet data, the method 1000 combines the phone data and the Internet data into a combined model profiling the user, step 1016. In the illustrated embodiment, a combined model profiling a user includes an aggregate of the estimated properties determined previously.

As can be see, the method 1000 may produce a combined data set for a given telephone number, the combined data set including data gleaned from Internet data logs. In the illustrated embodiment, an existing set of properties for a given telephone number may be supplemented with the data retrieved from the method 1000. In this embodiment, the supplement telephone data records may be input into the method discussed with respect to FIG. 3.

Figure 11:
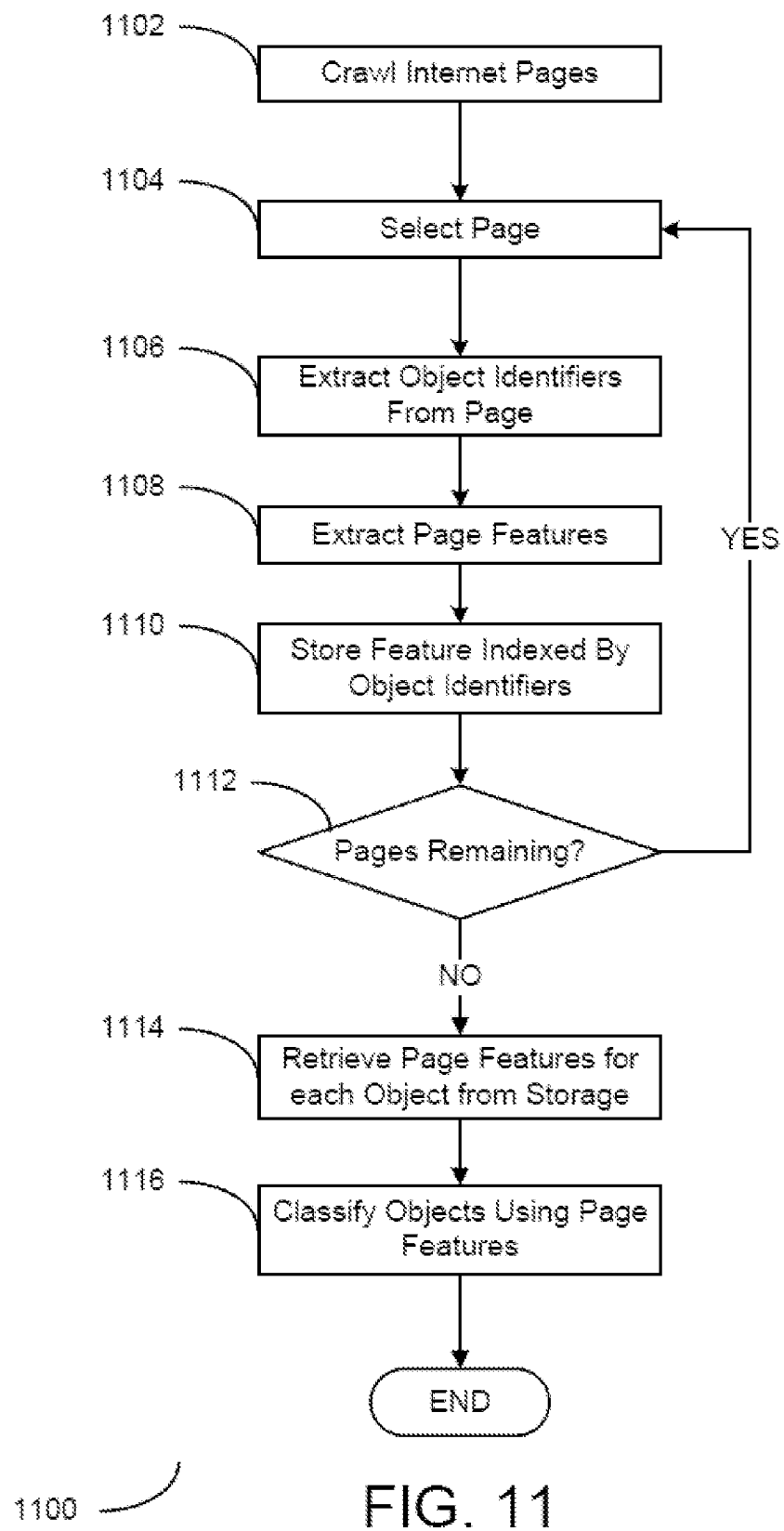
FIG. 11 present flow diagrams illustrating methods for extracting object identifiers and features from documents and classifying the extracted objects according to the similarity in the features of the pages in which they appear according to various embodiments of the present invention.

FIG. 11 illustrates an alternative method for extracting object identifiers and features from documents and classifying the extracted objects according to the similarity in the features of the pages in which they appear. According to the embodiment FIG. 11 illustrates, a method 1100 crawls a plurality of documents, step 1102. In the illustrated embodiment, the method 1100 employs various crawling mechanisms generally known to one of ordinary skill in the art. In one embodiment, the plurality of documents may comprise a corpus of Internet pages. In alternative embodiments, the plurality of documents may comprise e-mail data or social networking data.

Next, the method 1100 selects a given page, step 1104, and extracts object identifiers from the selected page, step 1106. An object identifier includes a predetermined object type of interest to the operator of the method 1100. For example, the operator may specify a plurality of telephone numbers, emails or names as objects. In turn, the method 1100 will identify those pages containing the listed telephone numbers or addresses from the crawled documents.

The method 1100 then extracts features of the webpage containing an identified object, step 1108. In one embodiment, features of a page includes various metrics as previous discussed such as the topic of a page, the location of the page content (e.g., a business location), or various other metrics available on a document.

Notably, after extracting page features and object identifiers, the method 1100b stores the features in a storage module (e.g., a database) and indexes the features by object identifier, step 1122. After parsing all crawled documents, step 1124, the method 1100b classifies the identified objects. In one embodiment, the method 1100b utilizes a previously created database of significant object identifiers. For example, the method 1100b may utilize a telecom provider's database of customer phone numbers to inspect the previously describe database.

In this manner, the method 1100 accesses the significant object identifiers and query the database to identify a plurality of previously identified document features, step 1114. After retrieving the plurality of document features associated with the object identifier, the method 1100b classifies the object identifier, step 1116. For example, the method 1100 may identify a phone number present on a job board posting or online resume. The method 1100 extracts the phone number as an object and the concept of "job seeker" as a feature, or alternatively, the job industry of the posting. Based on these identified objects and features, the method 1100 classifies the telephone number as a user interested in job offers in a particular industry. From this information, a subsequent viewer of the data is able to identify said phone number as a potential lead for job offers in the identified industry. In one embodiment, the results of method 1100 may be utilized to enrich a training data set for a method for generating high-value customer leads (e.g., the method of FIG. 3). Although described as extracting objects based on documents, in alternative embodiments, the method 1100 may be utilized to identify pages containing a given object. For example, the method 1100 may first determine a subset of documents containing the identified object, and parse features from the subset.

Figure 12A:
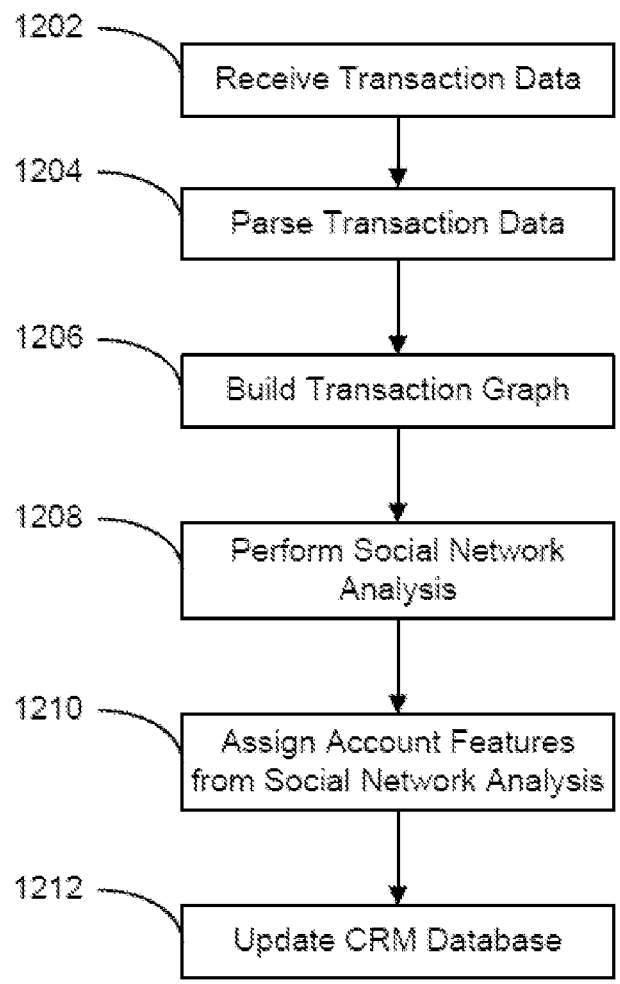
FIG. 12a presents a flow diagram illustrating a method for predicting bank account features based on a social network analysis of a bank transaction graph according to one embodiment of the present invention.

FIG. 12a presents a flow diagram illustrating a method for predicting bank account features based on a social network analysis of a bank transaction graph according to one embodiment of the present invention. According to the embodiment that FIG. 12a illustrates, a method 1200a receives transaction data, step 1202. In the illustrated embodiment, the method 1200a receives transaction data by providing bank account holders the ability to transfer funds to other account holders internal or external to the bank operating the method 1200a. In one embodiment, transaction data includes a log of bank transactions. A log entry includes the bank account of the initiating and receiving parties as well as the date of the transaction and the direction and amount transferred. Optionally, the currency or asset being transferred may be included in the log entry. Optionally, any name assigned to the sending or receiving party may be included in the log entry. Optionally, any notice or memorandum attached to the transfer may be included in the log entry. Optionally, any location information known about the sending or receiving parties may be included in the log entry.

After receiving the transaction data, the method 1200a parses the transaction data, step 1204. In one embodiment, parsing transaction data includes summing the transactions over a window of time. In one embodiment, transactions made between the same two accounts and in the same direction are summed over a pre-specified window of time to form weight for each summed transaction. Weight includes the total amount transferred during a period of time. The weight parameter takes into account all types of assets being transferred. Optionally, the amounts transferred between two accounts in the two directions may be summed together to form the balance for each non-directional summed transactions. The term "balance" as used herein refers to the direction of the transfer, so for example; if there are an equal number of amount transferred between the two accounts in both directions, the balance is zero. The value of balance is equal to one (1) if transfer is only in one direction or minus one (−1) if the transfer is only in the other direction.

The method 1200a then builds a transaction graph based on the parsed transaction data, step 1206. In one embodiment, the nodes of this transaction graph are bank accounts and the edges connecting the nodes are the transactions or summed transactions. Usually the transaction graph will be directional according to the directions of the transactions, but if the summed transactions contain balance information the transaction graph will be unidirectional. Optionally, the amount or summed amount of each transaction can be used as weights over the transaction graph edges.

In an alternative embodiment, various external data is used to supplement the transaction graph. Customer relationship management (CRM) databases are used to add additional information for the nodes of the transaction graph. This only applies to nodes that represent customers of the bank performing the analysis. Such additional information includes the total wealth of the customer and the residence address of the customer.

After building the transaction graph, the method 1200a performs various social network analyses on the transaction graph, step 1208. In the illustrated embodiment, social network analysis takes into account the social network formed by the account owners. For example, members of a karate club may have more transfers between them than transfers they will have with others that are not members of the karate club. After performing the social network analyses, the method 1200a assigns account features from social network analyses to the bank accounts, step 1210. For example, a bank account is assigned to be (or not to be) a member of a karate club. Optionally, the attributes assigned may be probabilistic, with a probability value or score, assigned to the correctness of the attribute.

Finally, the method 1200a updates the CRM database with the attributes determined by the social network analyses for subsequent retrieval and processing, step 1212. Alternatively, if the owner of a bank account is not a customer of the bank then the assigned information may be used to generate a marketing report that can be then used by the marketing department of the bank to try to acquire the customer. For example, the marketing department can build a special offer for karate club members that are not already bank customers.

Figure 12B:
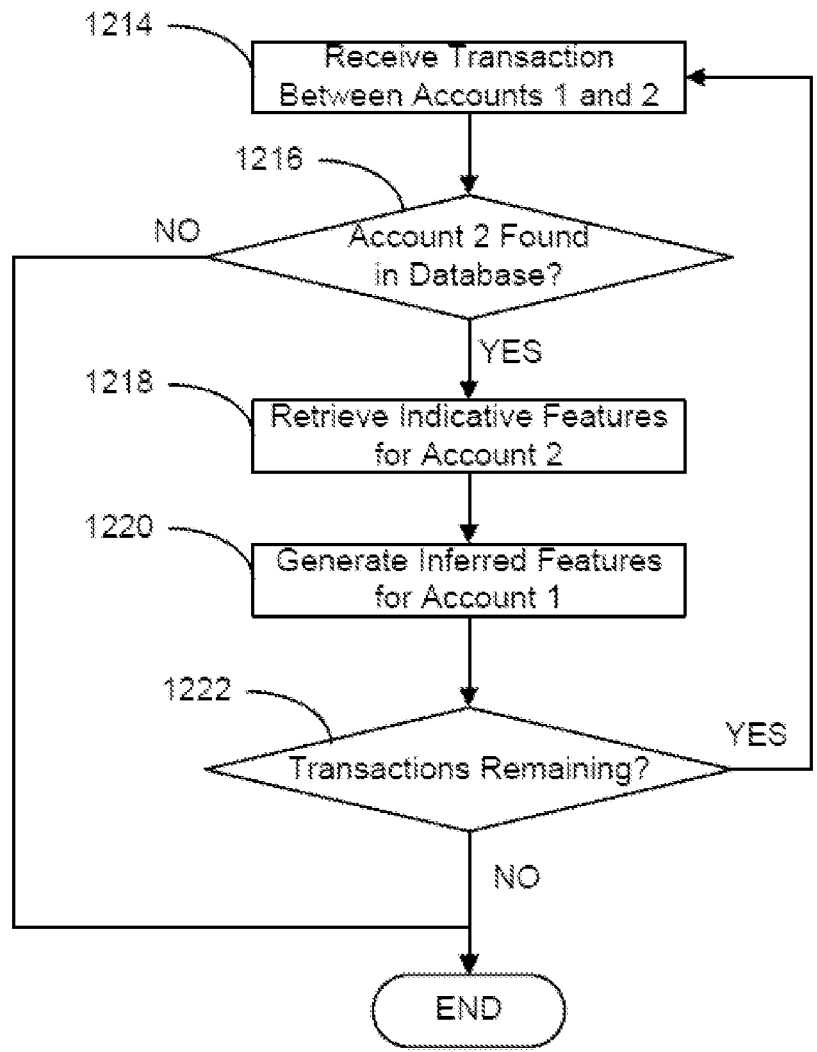
FIG. 12b presents a flow diagram illustrating an alternative method for predicting bank account features based on indicative features according to one embodiment of the present invention.

FIG. 12b presents a flow diagram illustrating an alternative method for predicting bank account features based on a social network analysis of a bank transaction graph according to one embodiment of the present invention. According to the embodiment that FIG. 12b illustrates, a method 1200b receives transactions between two accounts: Account 1 and Account 2, step 1214. A log entry representing the transaction includes the bank account of the initiating and receiving parties as well as the direction of transfer. Optionally, any location information known about the sending or receiving parties may be included in the log entry.

The method 1200b then determines if Account 2 is present in the bank's account database, step 1216. If the account is not found, the account is ignored. Conversely, if the account is found the method 1200b retrieves indicative features for Account 2, step 1218. In the illustrated embodiment, the indicative attributes indicates that the account is a supplier of a specific category. For example, that it is a kindergarten school. In alternative embodiments, the method 1200b may skip step 216 and process both accounts with the bank and accounts not associated with the bank.

The method 1200b then generates inferred features for Account 1 based on the indicative features of Account 2, step 1220. For example, if the attributes of Account 2 indicate it to be a supplier of a certain good and if the direction of transfer is from Account 1 to Account 2 and if the amount transferred falls within a reasonable range for the good then Account 1 is a consumer of that good. For example, if Account 2 is a kindergarten school then Account 1 is assigned with the attribute of having a child attending the kindergarten. Optionally, the attributes assigned to Account 1 are probabilistic, with a probability value or score, assigned to the correctness of the attribute.

Figure 12C:
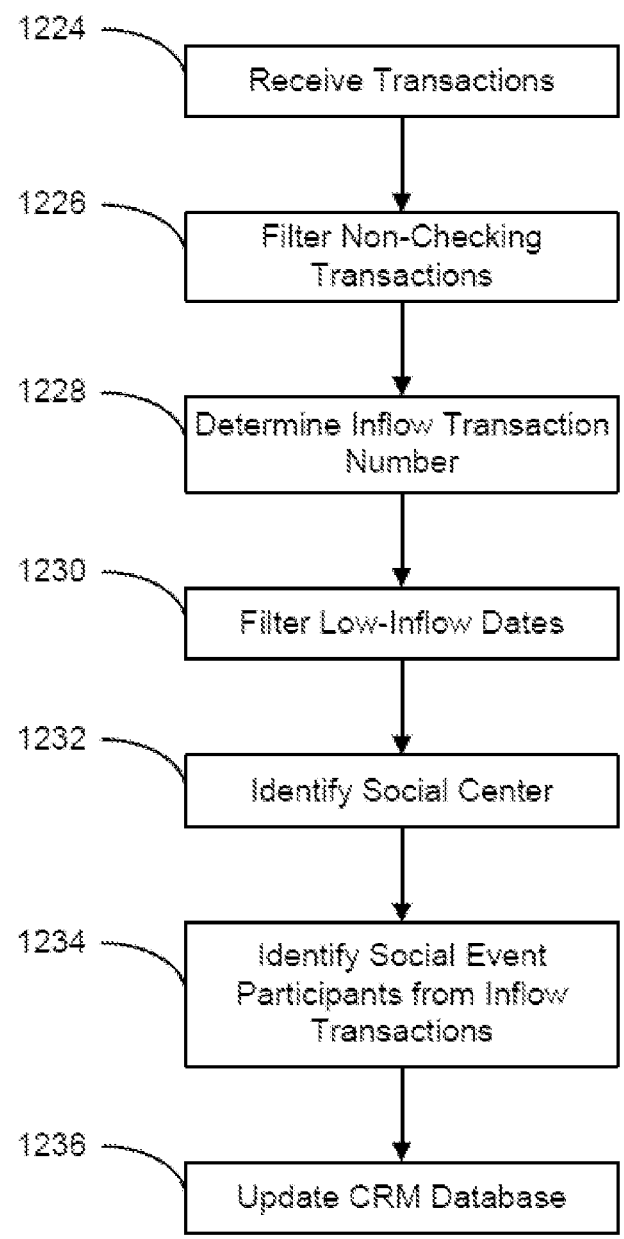
FIG. 12c presents a flow diagram illustrating a method for identifying a social center and event participants based on bank transaction logs according to one embodiment of the present invention.

Similar to method 1200a, the assigned attributes are then used to enrich the information already available on the bank's customers. This enriched information is stored in the CRM database. If the owner of a bank account is not a customer of the bank then the assigned information can be used to generate marketing report that is used by the marketing department of the bank to try to acquire the customer. For example, the marketing department can deduce that the owner of Account 1 lives nearby the kindergarten location and try to offer him the services of a branch located next to the kindergarten FIG. 12c presents a flow diagram illustrating a method for identifying a social center and event participants based on bank transaction logs according to one embodiment of the present invention. According to the embodiment that FIG. 12c illustrates, a method 1200c receives a plurality of transactions, step 1224. A transaction includes a log entry including the bank account of the initiating and receiving parties as well as the direction of transfer and the date. Optionally, the type of transaction, either wire or check, is recorded.

Optionally, the method 1200c filters the incoming transaction to exclude all non-checking transactions, step 1226. The method 1200c then calculates the number of inflow transactions performed into each identified account, step 1228 and filters low in-flow dates, step 1230. In one embodiment, the method checks that there is only one transfer between every two accounts on the same day.

The method 1200c uses the inflow calculations to identify a social center, step 1232. In the illustrated embodiment, a social center includes a bank account receiving a high volume of incoming transaction in a short period of time. Such account generally represents a large social event, such as a wedding or birthday.

After identifying the social center, the method 1200c identifies the bank accounts, transferring funds to the social center ("social participants") in the specified time frame, step 1234. Optionally, the method 1200c reinforces social event membership if the same social event memberships appear in different large social gathering events, where in each such event there is a different center.

Similar to methods 1200a and 1200b, the assigned social participant attributes are used to enrich the information already available on the bank's customers. This enriched information can be stored in a CRM database. If the owner of a bank account is not a customer of the bank then the assigned information can be used to generate marketing report that can be then used by the marketing department of the bank to try to acquire the customer. Additionally, the methods 1200a-c may utilize the various techniques discussed previously for enriching the training data used to generate the model. For example, the methods 1200a-c may utilize transaction data to enrich the information a bank has about their customers, or customers of another bank prior to training a model.

All the description above can be applied to any network of nodes which can be split into an internal and external network(s) and in which behind the node(s) there exist person(s) or entities. For example and not limited to: phone networks with several providers, bank account network with several banks, email networks with several providers, instant messaging networks that are federated together, social web sites that are integrated to communicate together (e.g. using the Open Social API.)

One of the most important attributes that could be predicted for a non-customer of a communication provider, is its likelihood of the non-customer to be acquired and turned into a customer of the communication provider. By predicting the likelihood, a provider can sort the non-customers according to their likelihood and target its marketing efforts on the most likely targets. The communication provider can be a telephony provider, email service provider, social network provider, instant messaging provider, or financial banking institute.

One method to predict the likelihood of acquisition is to take any technique known in the art to predict the likelihood of a customer to turn into a non-customer (churn event) and use the same technique with appropriate adaptation to predict acquisition of non-customers. Methods 700a and 700b describe churn prediction. Among the technique known in the art for churn prediction, it is common to identify customers that have already churned and to measure the social influence these customers have on other customers on turning into non-customers. Therefore a method to predict the likelihood of acquiring a non-customer is made by finding customers that have already been acquired and measuring the social influence these customers have on the non-customer.

Among the techniques that use social influence to predict churn, we will give reference to patent application publication no. US20090192809 which is expressly incorporated herein by reference in its entirety for all purposes. Therefore a method to predict the likelihood of acquiring a non-customer is made by forming a social network graph from the transactions between the customers and non-customers and applying a spreading activation model to said graph which starts from previously acquired customers and measuring the activation level of the non-customer.

Another method to predict the likelihood of acquisition, is to predicting when a contract period of a non-customer is about to expire, wherein said prediction is based on predicting the start period of the contract of the non-customer with an external provider. This method applies when a non-customer has a known contractual period with the external provider, such in telephony providers.

One method to predict the start period is made from obtaining data pertaining to telephone calls between external and internal customers and measuring the date on which these calls where started.

A second method to predict the start period is based on tracking the date in which the external customer churned from the internal network as described in method 500a and 500b.

FIGS. 1 through 12 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computerized method for predicting one or more desired properties of a relationship between external and internal nodes based on a selected group of relationships between internal nodes and other nodes about which it is known whether the relationships have the one or more desired properties, the method comprising:

storing in one or more data structures a first data set regarding relationships between external nodes and internal nodes and a second data set regarding relationships between internal nodes and other nodes in a selected group, each data set having one or more data items representing one or more events relating to or attributes of each relationship in the data set, the second data set including one or more types of data items not included in the first data set;

virtualizing the second data set regarding relationships between internal nodes into a modeled second data set after the first data set regarding relationships between internal and external nodes at least by eliminating from the second data set the one or more data item types not included in the first data set;

modeling the virtualized second data set to identify from the modeled second data one or more modeled events or attributes of relationships between internal nodes and other nodes in the selected group that are statistically likely to identify relationships that have one or more desired properties;

and predicting which of the relationships between internal and external nodes are statistically likely to have the one or more desired properties based on the identified one or more modeled events or attributes and the one or more events or attributes in the first data set.

2. The method of claim 1, wherein storing the second data set comprises storing data items regarding relationships between internal nodes and other nodes that all are known to have the one or more desired properties.

3. The method of claim 1, wherein storing the second data set comprises storing data items regarding a positive set of relationships between internal nodes and other nodes that are known to have the one or more desired properties and a negative set of relationships between internal nodes that are known to not have the one or more desired properties.

4. The method of claim 1, wherein storing the second data set comprises storing data items regarding a weighted set of relationships between internal nodes and other nodes, the weighted set comprising a set of one or more desired properties.

5. The method of claim 1, comprising generating the second data set from a larger data set.

6. The method of claim 1, wherein virtualizing the second data set further comprises collecting transactions beginning or ending at the internal node or other node of each relationship between internal nodes and other node to form a feature set for the relationships between internal nodes and other but ignoring transactions that end with external nodes that are not part of the relationship.

7. The method of claim 6, wherein virtualizing the second data set regarding relationships between internal nodes after the first data set regarding relationships between external nodes further comprises combining a plurality of nodes determined to be a member of a known subnet and ignoring all transactions within the known subnet.

8. A computerized method for identifying non-customers of a telecom provider that are more likely to become customers of the telecom provider than other non-customers, the method comprising:
storing, in one or more data structures, a first data set regarding non-customers of a telecom provider and a second data set regarding customers of the telecom provider in a selected group, each data set having one or more data items representing one or more attributes of or call transactions involving each customer or non-customer in the data set, the second data set including one or more additional data items of attributes or call transactions not included in the first data set, the one or more additional data items being based on information available to the telecom provider only about customers of the telecom provider;
modeling the second data set to identify from the modeled second data one or more properties of telecom provider customers in the selected group that are statistically likely to identify the customers of the telecom provider that have one or more desired properties identified by the telecom provider;
and predicting, based on the modeled second data set, which of the non-customers in the first data set are statistically likely to have the one or more desired properties and more likely to become customers of the telecom provider.

9. The method of claim 8, wherein storing the second data set comprises storing data items regarding customers that all are known to have the one or more desired properties.

10. The method of claim 8, wherein storing the second data set comprises storing data items regarding a positive set of customers that are known to have the one or more desired properties and a negative set of customers that are known to not have the one or more desired properties.

11. The method of claim 8, wherein storing the second data set comprises storing data items regarding a weighted set of customers, the weighted set comprising a set of one or more desired properties.

12. The method of claim 8, comprising generating the second data set from a larger data set.

13. The method of claim 8, wherein the one or more desired properties comprise one or more properties of the non-customers that are specified by an internal operator, and wherein storing the first and second data sets comprises storing data received from the service provider.

14. The method of claim 1 in which the one or more desired properties include a relation the external node has with another node.

15. The method of claim 1 in which the one or more desired properties include a relationship the external phone number has with another phone number.

16. The method of claim 15 in which the relationship is family membership.

17. The method of claim 15 in which the relationship is same ownership.

18. The method of claim 1, wherein the internal nodes represent customers of a service provider and the external nodes represent entities that are not customers of the service provider, wherein the one or more desired properties comprise one or more properties of the relations of the non-customer entities that are specified by the service provider, and wherein storing the first and second data sets comprises storing data received from the service provider.

19. The method of claim 18, wherein storing the first and second data sets comprises storing transaction data regarding transactions involving customer and non-customer entities of the service provider.

20. The method of claim 19, wherein the service provider comprises a telephone operator, and wherein storing transaction data comprises storing call detail records (CDRs) of telephone calls by or to customers and non-customer entities.

21. The method of claim 18 in which the relations include family membership.

22. The method of claim 18 in which the relations include same ownership.

23. The method of claim 1 wherein the one or more desired properties includes a likelihood of acquisition of one of the external nodes.

24. A system for predicting one or more desired properties of a relationship between external and internal nodes based on a selected group of relationships between internal nodes and other nodes about which it is known whether the relationships have the one or more desired properties, the system comprising:
a processor; and
a memory having executable instructions stored thereon that when executed by the processor cause the processor to:
store in one or more data structures a first data set regarding relationships between external nodes and internal nodes and a second data set regarding relationships between internal nodes and other nodes in a selected group, each data set having one or more data items representing one or more events relating to or attributes of each relationship in the data set, the second data set including one or more types of data items not included in the first data set;
virtualize the second data set regarding relationships between internal nodes into a modeled second data set after the first data set regarding relationships between internal and external nodes at least by eliminating from the second data set the one or more data item types not included in the first data set;
model the virtualized second data set to identify from the modeled second data one or more modeled events or attributes of relationships between internal nodes and other nodes in the selected group that are statistically likely to identify relationships that have one or more desired properties; and
predict which of the relationships between internal and external nodes are statistically likely to have the one or more desired properties based on the identified one or more modeled events or attributes and the one or more events or attributes in the first data set.

25. A system for identifying non-customers of a telecom provider that are more likely to become customers of the telecom provider than other non-customers, the system comprising:
a processor; and
a memory having executable instructions stored thereon that when executed by the processor cause the processor to:
store, in one or more data structures, a first data set regarding non-customers of a telecom provider and a second data set regarding customers of the telecom provider in a selected group, each data set having one or more data items representing one or more attributes of or call transactions involving each customer or non-customer in the data set, the second data set including one or more additional data items of attributes or call transactions not included in the first data set, the one or more additional data items being based on information available to the telecom provider only about customers of the telecom provider;
model the second data set to identify from the modeled second data one or more properties of telecom provider customers in the selected group that are statistically likely to identify the customers of the telecom provider that have one or more desired properties identified by the telecom provider; and
predict, based on the modeled second data set, which of the non-customers in the first data set are statistically likely to have the one or more desired properties and more likely to become customers of the telecom provider.

26. Non-transitory computer readable media comprising program code that when executed by a programmable processor causes execution of a method for predicting one or more desired properties of a relationship between external and internal nodes based on a selected group of relationships between internal nodes and other nodes about which it is known whether the relationships have the one or more desired properties, the computer readable media comprising:
computer program code for storing in one or more data structures a first data set regarding relationships between external nodes and internal nodes and a second data set regarding relationships between internal nodes and other nodes in a selected group, each data set having one or more data items representing one or more events relating to or attributes of each relationship in the data set, the second data set including one or more types of data items not included in the first data set;
computer program code for virtualizing the second data set regarding relationships between internal nodes into a modeled second data set after the first data set regarding relationships between internal and external nodes at least by eliminating from the second data set the one or more data item types not included in the first data set;
computer program code for modeling the virtualized second data set to identify from the modeled second data one or more modeled events or attributes of relationships between internal nodes and other nodes in the selected group that are statistically likely to identify relationships that have one or more desired properties; and
computer program code for predicting which of the relationships between internal and external nodes are statistically likely to have the one or more desired properties based on the identified one or more modeled events or attributes and the one or more events or attributes in the first data set.

27. Non-transitory computer readable media comprising program code that when executed by a programmable processor causes execution of a method for identifying non-customers of a telecom provider that are more likely to become customers of the telecom provider than other non-customers, the computer readable media comprising:
computer program code for storing, in one or more data structures, a first data set regarding non-customers of the telecom provider and a second data set regarding customers of a telecom provider in a selected group, each data set having one or more data items representing one or more attributes of or call transactions involving each customer or non-customer in the data set, the second data set including one or more additional data items of attributes or call transactions not included in the first data set, the one or more additional data items being based on information available to the telecom provider only about customers of the telecom provider;
computer program code for modeling the second data set to identify from the modeled second data one or more properties of telecom provider customers in the selected group that are statistically likely to identify the customers of the telecom provider that have one or more desired properties identified by the telecom provider; and
computer program code for predicting, based on the modeled second data set, which of the non-customers in the first data set are statistically likely to have the one or more desired properties and more likely to become customers of the telecom provider.

* * * * *